(12) United States Patent
Taguchi

(10) Patent No.: US 10,794,098 B2
(45) Date of Patent: Oct. 6, 2020

(54) HINGE DEVICE AND IMAGE FORMING APPARATUS

(71) Applicant: Brother Kogyo Kabushiki Kaisha, Nagoya-shi, Aichi-ken (JP)

(72) Inventor: Kazuna Taguchi, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 16/020,368

(22) Filed: Jun. 27, 2018

(65) Prior Publication Data

US 2019/0003222 A1 Jan. 3, 2019

(30) Foreign Application Priority Data

Jun. 29, 2017 (JP) .................................. 2017-127806

(51) Int. Cl.
*E05D 3/12* (2006.01)
*G03G 15/00* (2006.01)
*G03G 21/16* (2006.01)
*H04N 1/00* (2006.01)
*E05D 11/10* (2006.01)

(52) U.S. Cl.
CPC .......... *E05D 3/122* (2013.01); *G03G 15/6552* (2013.01); *G03G 21/1619* (2013.01); *G03G 21/1633* (2013.01); *E05D 11/105* (2013.01); *E05Y 2900/606* (2013.01); *G03G 15/5016* (2013.01); *H04N 1/00496* (2013.01)

(58) Field of Classification Search
CPC ... E05D 3/122; G03G 15/502; G03G 15/5016
See application file for complete search history.

(56) References Cited

U.S. PATENT DOCUMENTS

| 7,702,255 B2* | 4/2010 | Ishii .................... B41J 29/13 399/124 |
| 2005/0078818 A1 | 4/2005 | Bae |
| 2008/0120809 A1 | 5/2008 | Nakasone |
| 2017/0064106 A1 | 3/2017 | Murakami et al. |

FOREIGN PATENT DOCUMENTS

| JP | 2004-021179 A | 1/2004 |
| JP | 2005-167205 A | 6/2005 |
| JP | 2008-133680 A | 6/2008 |
| JP | 2010-256570 A | 11/2010 |
| JP | 2017-044991 A | 3/2017 |

* cited by examiner

*Primary Examiner* — Walter L Lindsay, Jr.
*Assistant Examiner* — Andrew V Do
(74) *Attorney, Agent, or Firm* — Banner & Witcoff, Ltd.

(57) ABSTRACT

A hinge device includes a support member, a pivotable member supported by the support member, a first gear located at one of the support member and the pivotable member, a second gear located at the other of the support member and the pivotable member, a friction member configured to apply rotational frictional resistance to the second gear, and means for disengaging. The pivotable member is configured to pivot about a pivot axis between a closed position and a different position where the pivotable member is in a position that is different from the closed position. The second gear is configured to rotate in engagement with the first gear based on pivoting of the pivotable member. When the pivotable member is at the closed position, the means for disengaging disengages the first gear and the second gear from each other.

17 Claims, 13 Drawing Sheets

HINGE DEVICE AND IMAGE FORMING APPARATUS

CROSS-REFERENCE TO RELATED APPLICATION

This application claims priority from Japanese Patent Application No. 2017-127806 filed on Jun. 29, 2017, the content of which is incorporated herein by reference in its entirety.

FIELD OF DISCLOSURE

Aspects of the disclosure relate to a hinge device configured to hold a pivotable member supported by a support member in place at any angle, and an image forming apparatus including the hinge device.

BACKGROUND

A known hinge device includes a support member, and a pivotable member supported by the support member. The pivotable member is pivotable about an axis between a first position or closed position where the pivotable member is located close to the support member and a second position or different position where the pivotable member is spaced from the support member more than when located at the closed position. The hinge device is comprised of what is called a "free stop" hinge, allowing the support member to support the pivotable member in place at any angle.

The hinge device includes a first gear portion provided at the pivotable member, and a second gear portion provided at the support member. The second gear portion is engageable with the first gear portion, and rotatable in response to pivotal movement of the pivotable member. The hinge device is configured to hold the pivotable member in place at any angle by applying rotational frictional resistance to the second gear portion.

SUMMARY

The above hinge device uses rotational frictional resistance, which is applied the second gear portion, to hold the pivotable member in place at any angle. When the pivotable member is moved from the different position to the closed position, the pivotable member may return slightly toward the different position from the closed position due to reaction force resulting from frictional resistance applied to the second gear portion.

A hinge device is designed that the pivotable member located at the closed position is accommodated in an accommodating portion provided in the support member. If the pivotable member pivots from the different position to the closed position and slightly moves back toward the different position, the pivotable member protrudes from the accommodating portion, which may adversely affect the appearance of the hinge device.

Illustrative aspects of the disclosure provide a hinge device configured to, when a pivotable member pivots from a different position to a closed position, allow the pivotable member to stay at the closed position without moving back toward the different position, and an image forming apparatus including the hinge device.

According to an aspect of the disclosure, a hinge device includes a support member, a pivotable member, a first gear, a second gear, a friction member, and means for disengaging. The pivotable member is supported by the support member and configured to pivot about a pivot axis between a closed position and a different position where the pivotable member is in a position that is different from the closed position. The first gear is located at one of the support member and the pivotable member. The second gear is located at the other of the support member and the pivotable member. The second gear is configured to rotate in engagement with the first gear based on pivoting of the pivotable member. The friction member is configured to apply rotational frictional resistance to the second gear. When the pivotable member is at the closed position, the means for disengaging disengages the first gear and the second gear from each other.

This structure enables the hinge device to, when the pivotable member pivots from the different position to the closed position, reduce a chance of the pivotable member from moving back from the closed position toward the different position, and allow the pivotable member to stay at the closed position.

BRIEF DESCRIPTION OF THE DRAWINGS

Aspects of the disclosure are illustrated by way of example and not by limitation in the accompanying figures in which like reference characters indicate similar elements.

DETAILED DESCRIPTION

An illustrative embodiment of the disclosure will be described with reference to the accompanying drawings.

The general structure of an image forming apparatus 1 will be described with reference to FIG. 1.

Figure 1:
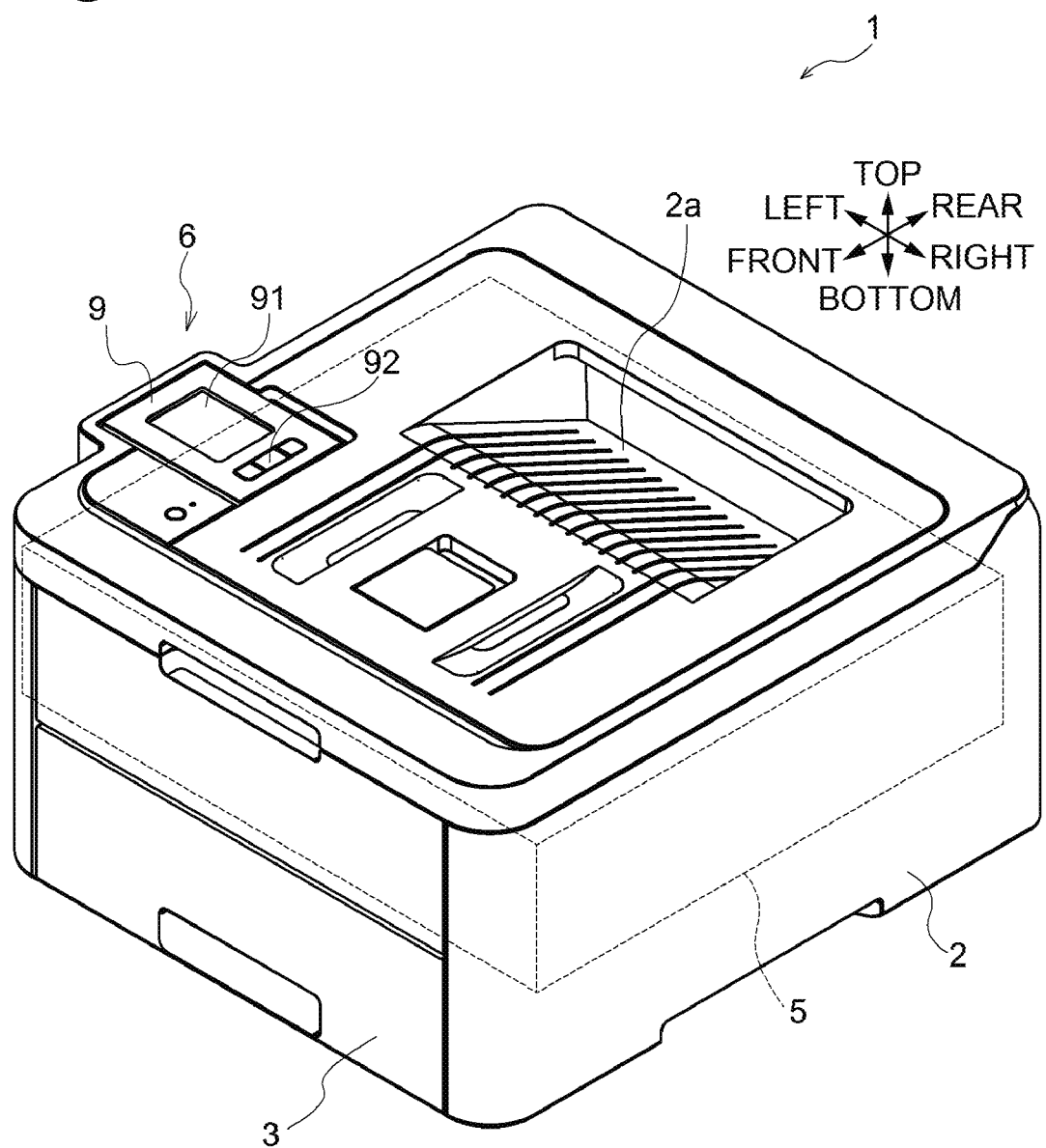
FIG. 1 is a perspective view of an image forming apparatus including a hinge device according to an illustrative embodiment.
Figure 2:
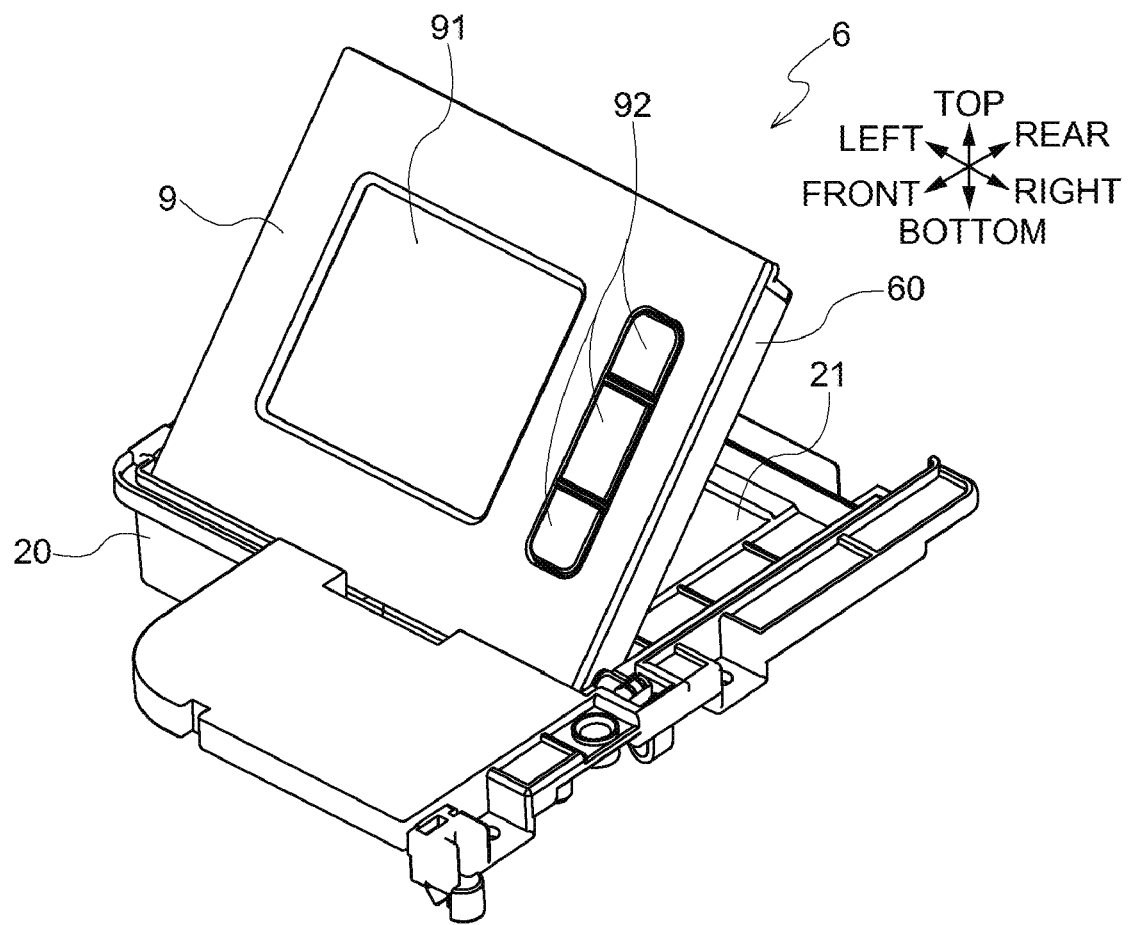
FIG. 2 is a front perspective view of the hinge device.
Figure 3:
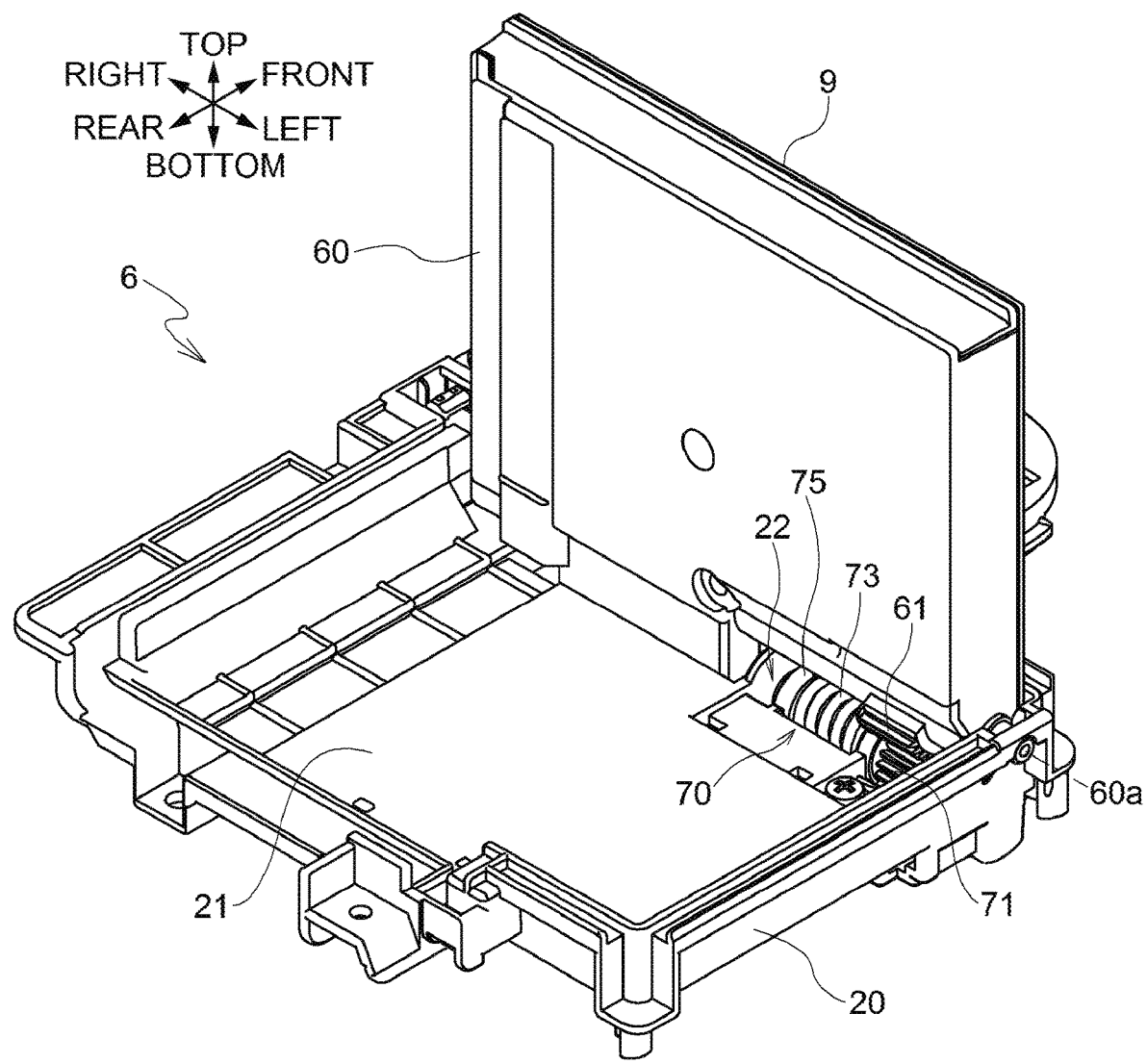
FIG. 3 is a rear perspective view of the hinge device.
Figure 4:
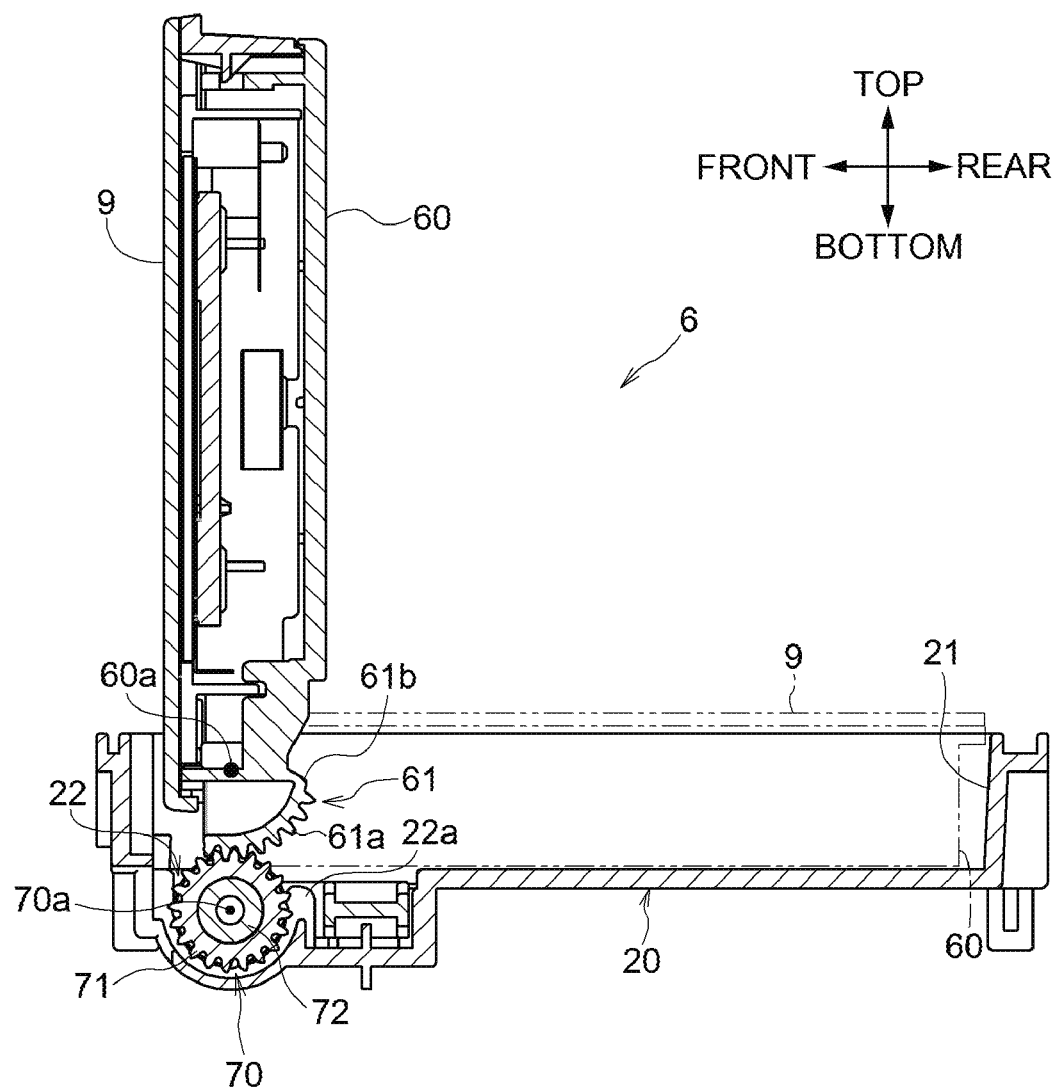
FIG. 4 is sectional view of the hinge device in which a pivotable member is located at a second position.
Figure 5:
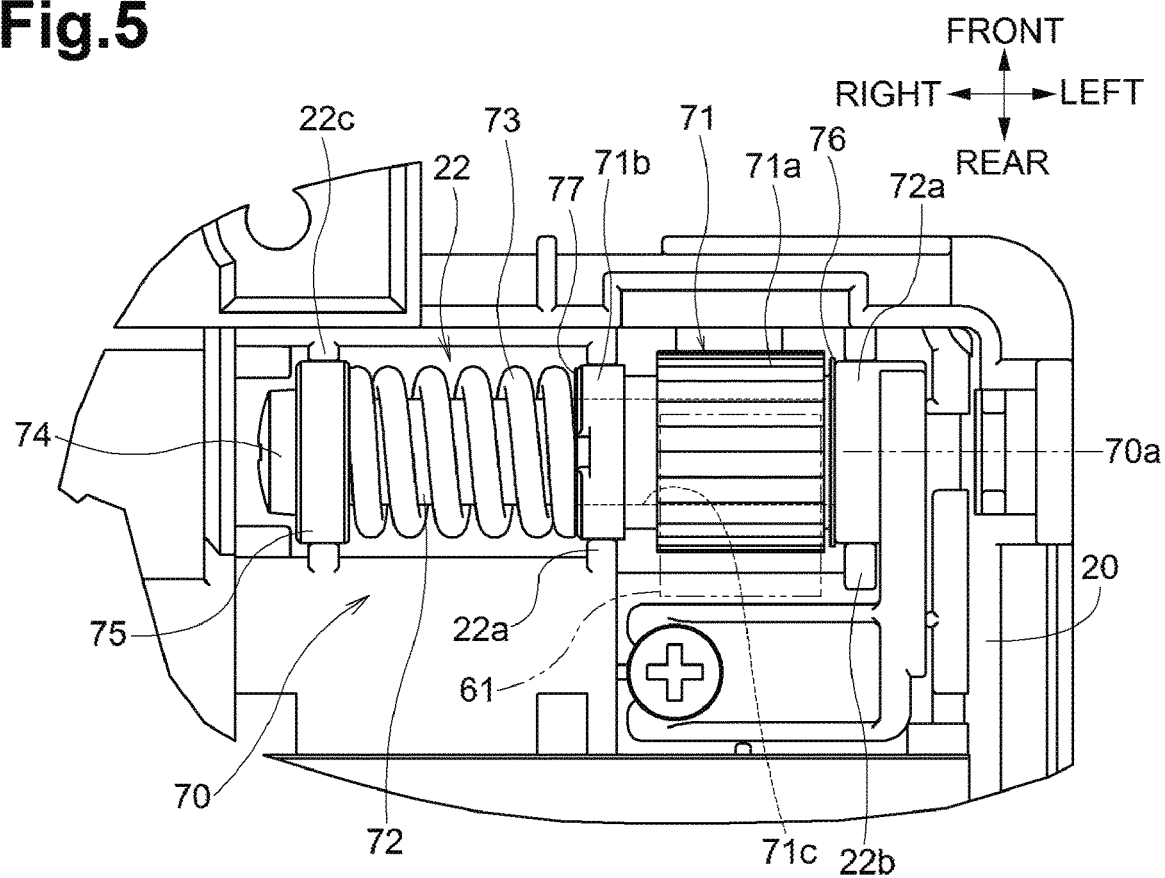
FIG. 5 is a plan view of a second gear assembly supported by the support member.
Figure 6:
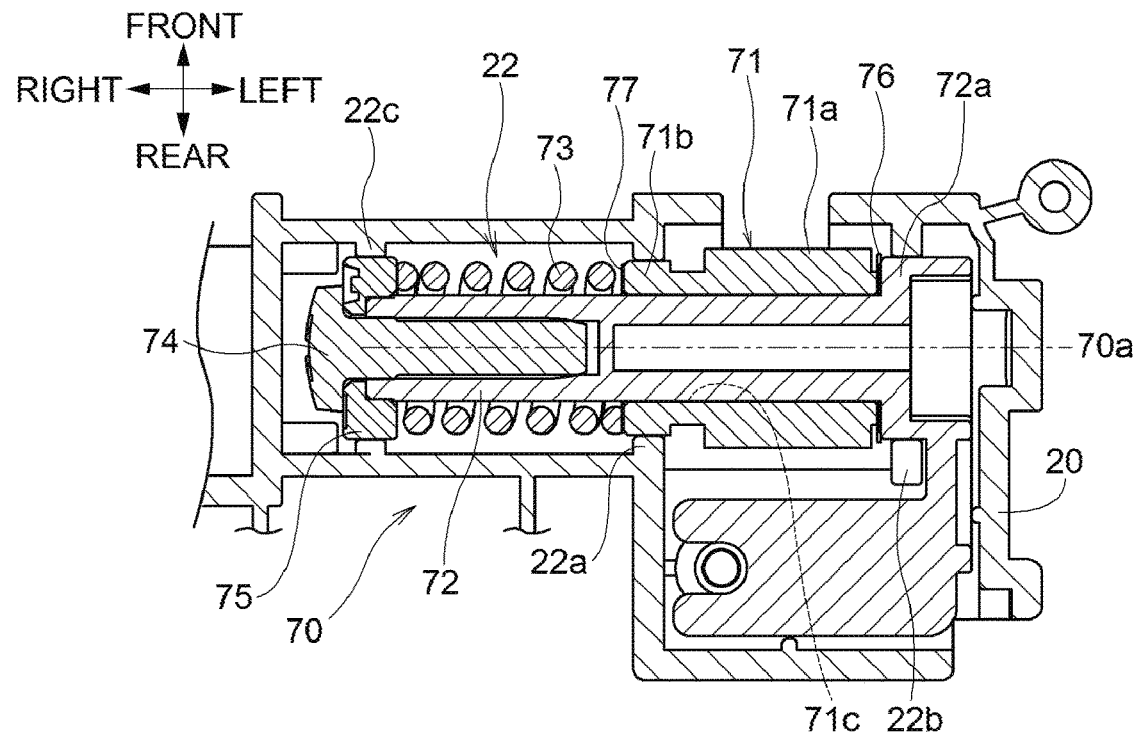
FIG. 6 is a plan sectional view of second gear assembly supported by the support member.

The image forming apparatus 1 illustrated in FIG. 1 is an example of an image forming apparatus including a hinge device according to an aspect of the disclosure.

For ease of discussion, in the following description, the top or upper side, the bottom or lower side, the left or left side, the right or right side, the front or front side, and the rear or rear side of the image forming apparatus 1 will be identified as indicated by the arrows in FIG. 1. For various individual objects of the image forming apparatus 1, sides of the individual objects will be similarly identified based on the arranged/attached position of the object on/in the image forming apparatus 1 shown in FIG. 1. The top and bottom direction may be referred to as a height direction, and the left and right direction may be referred to as a width direction.

As illustrated in FIG. 1, the image forming apparatus 1 includes a housing 2, a sheet cassette 3 configured to accommodate sheets, and an image forming device 5 configured to form an image on a sheet.

The housing 2 is substantially box-shaped, and accommodates the sheet cassette 3 and the image forming device 5.

A substantially central portion of the upper surface of the housing 2 contains a discharge tray 2a to which a sheet having an image formed at the image forming device 5 is discharged. A front left portion of the upper surface of the housing 2 contains a hinge device 6.

The sheet cassette 3 is disposed at a bottom portion of the housing 2. The image forming device 5 is disposed above the sheet cassette 3. The image forming device 5 may be a laser-printing device or an inkjet-printing device.

The hinge device 6 holds a panel 9. The panel 9 includes a display 91 and an operation device 92. The display 91 displays a status or function of the image forming apparatus 1. The operation device 92 has operation keys to input commands to the image forming apparatus 1. The display 91 may be comprised of a touchscreen having input functions to the image forming apparatus 1.

First Embodiment

As illustrated in FIGS. 2-6, the hinge device 6 includes a support member 20, a pivotable member 60, a first gear 61, and a second gear assembly 70.

The support member 20 is mounted in the upper surface of the housing 2. The pivotable member 60 is supported by the support member 20 such that the pivotable member 60 is pivotable about a pivot axis 60a. The first gear 61 is located at the pivotable member 60, and rotatable about the pivot axis 60a integrally with the pivotable member 60. The second gear assembly 70 is supported by the support member 20, and is engageable with the first gear 61. The pivot axis 60a extends in the left-right direction.

The support member 20 includes an accommodating portion 21 and a support groove portion 22. The accommodating portion 21 is open-topped and configured to accommodate the pivotable member 60. The support groove portion 22 supports the second gear assembly 70.

The pivotable member 60 is configured to pivot about the pivot axis 60a between a first position (indicated by a phantom line in FIG. 4) where the pivotable member 60 is proximate to the support member 20 and is accommodated in the accommodating portion 21, and a second position (indicated by a solid line in FIG. 4) where the pivotable member 60 is further away from the support member 20 than at the first position. Examples of the first position include a closed position. Examples of the second position includes a different position different from the closed position.

The hinge device 6 is configured to hold the pivotable member 60 in position at any angle relative to the support member 20 by continuously adjusting an angle between the pivotable member 60 and the support member 20 while the pivotable member 60 pivots between the first position and the second position. When the pivotable member 60 is at the first position, the pivotable member 60 is accommodated in the accommodating portion 21.

The panel 9 is held at the upper surface of the pivotable member 60 located at the first position. As the pivotable member 60 holds the panel 9, the panel 9 is held by the image forming apparatus 1 via the hinge device 6. When the pivotable member 60 is at the first position, the panel 9 held by the pivotable member 60 is aligned with the upper surface of the housing 2.

The second gear assembly 70 includes a second gear 71, a gear shaft 72, and a pressing spring 73. The second gear 71 includes a teeth portion 71a engageable with the first gear 61, and a bearing 71b supported by the support member 20. The gear shaft 72 is supported at the support groove portion 22 of the support member 20, and supports the second gear 71 such that the second gear 71 rotates about a rotation axis 70a. The pressing spring 73 urges the second gear 71 to one side, e.g., to the left side in this embodiment, in a direction of the rotation axis 70a. The pressing spring 73 is a compression spring. The rotation axis 70a is an example of an axis of the second gear assembly 70. The direction of the rotation axis 70a is a direction in which the rotation axis 70a extends.

The second gear assembly 70 is supported at the support groove portion 22 of the support member 20 in an orientation that the rotation axis 70a of the second gear 71 is parallel to the pivot axis 60a.

In the second gear 71, the bearing 71b is at a different position from the teeth portion 71a in the direction of the rotation axis 70a, that is, to the right of the teeth portion 71a.

The second gear 71 has a support hole 71c formed therethrough in the direction of the rotation axis 70a, and the support hole 71c receives the gear shaft 72 therein rotatably.

The gear shaft 72 extends through the second gear 71 in the direction of the rotation axis 70a. A left portion of the gear shaft 72 extending from the second gear 71 to the left in the direction of the rotation axis 70a includes a large-diameter portion 72a. In the gear shaft 72, the large-diameter portion 72a has a diameter larger than a diameter of a portion where the second gear 71 is fitted.

The pressing spring 73 is fitted around a right portion of the gear shaft 72 extending from the second gear 71 toward the other side, e.g., toward the right side, in the direction of the rotation axis 70a. The gear shaft 72 has its right end in the direction of the rotation axis 70a into which a screw 74 is inserted via a bearing 75.

The pressing spring 73 is disposed between the bearing 75 and the second gear 71 in a compressed state, and urges the second gear 71 to the left in the direction of the rotation axis 70a.

The support groove portion 22 of the support member 20 includes support protrusions 22a, 22b, 22c protruding inwardly from an inner peripheral surface of the support groove portion 22 in a radial direction of the second gear assembly 70.

The support protrusion 22a supports the bearing 71b of the second gear 71 rotatably, the support protrusion 22b supports the large-diameter portion 72a of the gear shaft 72, and the support protrusion 22c supports the bearing 75.

Thus, the second gear assembly 70 is supported at the support groove portion 22 of the support member 20 such that the second gear 71 is rotatable.

The first gear 61 includes a teeth portion 61a engageable with the teeth portion 71a of the second gear 71, and a toothless portion 61b where no teeth are formed.

The toothless portion 61b is located such that, when the pivotable member 60 is at the first position, the toothless portion 61b faces the second gear 71. When the pivotable member 60 is at the first position, the first gear 61 and the second gear 71 of the second gear assembly 70 are disengaged from each other. In other words, when the pivotable member 60 is at the first position, the rotation of the first gear 61 is not transmitted to the second gear 71.

The teeth portion 61a of the first gear 61 is located such that, when the pivotable member 60 pivots from the first position toward the second position, the teeth portion 61a of the first gear 61 is engaged with the teeth portion 71a of the second gear 71.

The first gear 61 and the second gear 71 of the second gear assembly 70 are spur gears.

The second gear assembly 70 includes a friction member 76, which is located between the second gear 71 and the large-diameter portion 72a of the gear shaft 72. The friction member 76 is in contact with a left end surface of the second gear 71 in the direction of the rotation axis 70a. The friction member 76 has a high friction coefficient and applies rotational frictional resistance to the second gear 71 of the second gear assembly 70.

The second gear 71 is urged to the left by the pressing spring 73 in the direction of the rotation axis 70a, or the second gear 71 is urged to the friction member 76 by the urging force of the pressing spring 73.

The friction member 76 is made of film synthetic paper, for example.

Synthetic paper is a product typically manufactured from a synthetic resin as its primary material, which, while maintaining the characteristics of the material, offers several qualities similar to those of paper made primarily from wood pulp, for example, white and opaque appearance as well as its printing and processing capabilities.

Generally, film synthetic paper is produced by melting a synthetic resin with a filling material and additives, kneading the melt in an extruder, extruding it through a slit die, and stretching it into a film. Film synthetic paper according to the embodiment is produced by biaxial stretching, which involves extruding the melt resin through a slit die into a relatively thin resin sheet, temporarily cooling and then heating the resin sheet up to a melting temperature, and stretching the resin sheet biaxially or in the longitudinal direction and the lateral direction. As used herein, the longitudinal direction is a conveying direction where a film is conveyed in the stretching process, and the lateral direction is a direction orthogonal to the conveying direction.

In this embodiment, the film synthetic paper has micro voids formed inside the film in the stretching process.

The film synthetic paper may be comprised of a base layer stretched biaxially and a surface layer stretched in the lateral direction only, which is laminated on each surface of the base layer.

Such film synthetic paper has mechanical properties such as strength and stiffness due to its base layer stretched in the longitudinal and lateral direction, and looks like paper due to its surface layer stretched in the lateral direction only. In other words, micro voids formed in the surface layer in the stretching process enable the film synthetic paper to reflect light diffusely, and thus the film synthetic paper has high whiteness degree, high opacity, and high friction force. In addition, the base and outer layers have appropriate flexibility due to their micro voids.

As such film synthetic paper made up of the base layer and surface layers, YUPO, registered trademark, manufactured by Yupo Corporation, may be used.

In this embodiment, film synthetic paper having high friction force due to micro voids formed on the surfaces is used as the friction member 76. Thus, the friction member 76 is capable of giving great frictional resistance to the second gear 71 of the second gear assembly 70. As the film synthetic paper includes resin, the friction member 76 has high durability compared with synthetic paper including wood pulp.

A resin member 77 is located between the pressing spring 73 and the second gear 71. The resin member 77 is made from a material having a lower friction coefficient than a material of the friction member 76. The resin member 77 is in contact with a left end portion of the pressing spring 73.

As the resin member 77 has a lower friction coefficient than the friction member 76, friction between the resin member 77 and the friction member 76 is low. This reduces the pressing spring 73 from rotating together with the second gear 71 when the second gear 71 rotates, thus reducing the occurrence of unusual noise and deteriorated pivotal movement of the pivotable member 60.

The resin member 77 may be made from a nylon resin material having high sliding performance, for example, Polyslider, a registered trade mark of Asahi Polyslider Company, Limited.

The second gear 71 is made from a polyacetal (POM) resin material. The resin member 77 is made from a resin material having a friction coefficient lower than that of the POM resin material, and the friction member 76 is made from a resin material having a friction coefficient higher than that of the POM resin material.

In the hinge device 6 structured above, when the pivotable member 60 pivots about the pivot axis 60a between the first position and the second position, the first gear 61 rotates about the pivot axis 60a integrally with the pivotable member 60, which causes the second gear 71 of the second gear assembly 70 engaging the first gear 61 to rotate. That is, the first gear 61 rotates in response to pivotal movement of the pivotable member 60, and the second gear 71 of the second gear assembly 70 rotates in response to receiving of rotation of the first gear 61.

In this case, the second gear 71 is in contact with the friction member 76 and receives rotational frictional resistance from the friction member 76, and the frictional resistance from the friction member 76 is transmitted to the first gear 61 engaged with the second gear 71. Thus, the pivotable member 60 stops at an angle of when pivotal movement of the pivotable member 60 is stopped, due to the frictional resistance.

However, the hinge device 6 is configured such that, when the pivotable member 60 is at the first position, the first gear 61 is disengaged from the second gear 71 of the second gear assembly 70.

Figure 7A:
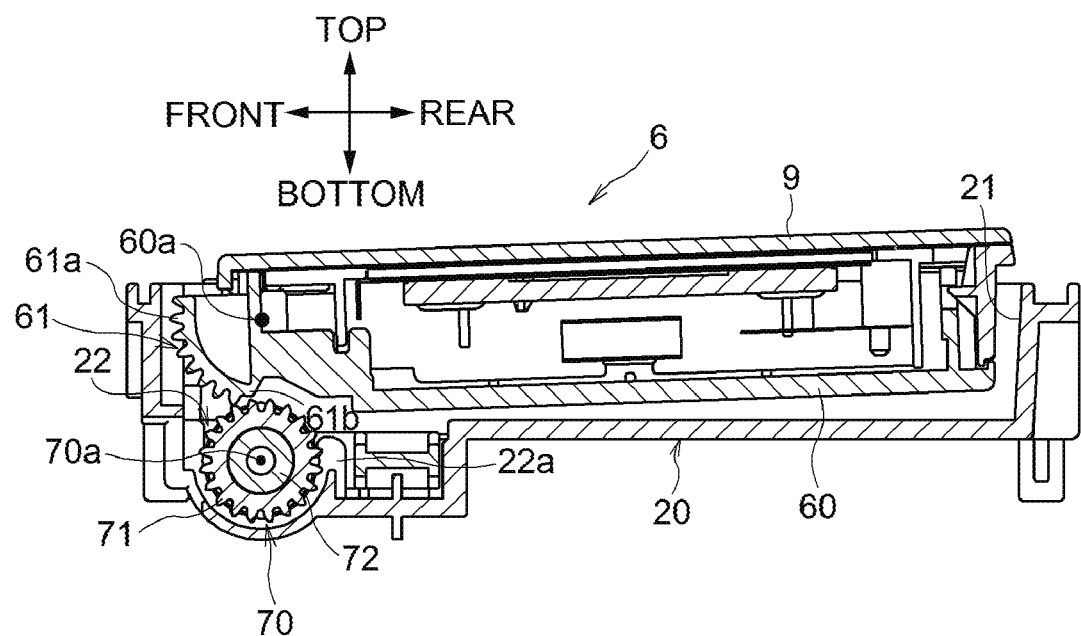
FIG. 7A is a sectional view of the hinge device in which the pivotable member is located at a position just short of the first position, and a first gear is disengaged from a second gear.
Figure 7B:
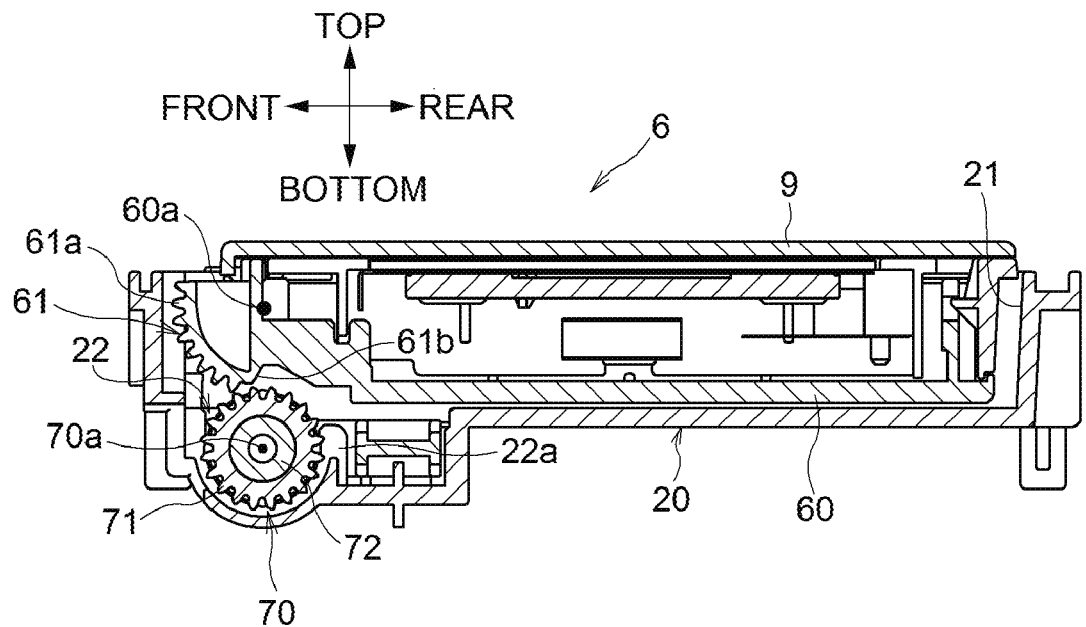
FIG. 7B is a sectional view of the hinge device in which the pivotable member is at the first position.

In other words, when the pivotable member 60 pivots from the second position (FIG. 4) toward the first position, the teeth portion 61a of the first gear 61 is disengaged from the second gear 71 just before the pivotable member 60 arrives at the first position, as illustrated in FIG. 7A. As illustrated in FIG. 7B, when the pivotable member 60 arrives at the first position, the toothless portion 61b of the first gear 61 faces the second gear 71, and the teeth portion 61a of the first gear 61 is not engaged with the second gear 71.

Thus, when the pivotable member 60 pivots to a position illustrated in FIG. 7A just short of the first position, the teeth portion 61a of the first gear 61 is disengaged from the second gear 71, and frictional resistance from the friction member 76 is not transmitted to the first gear 61. At the position just short of the first position, the pivotable member 60 is at two degrees, for example, relative to a horizontal. When the pivotable member 60 is at five degrees, for example, or more relative to the horizontal, the teeth portion 61a of the first gear 61 is engaged with the second gear 71 or the friction member 76 applies rotational frictional resistance to the second gear 71.

The pivotable member 60 is supported by the support member 20 such that the pivotable member 60 is pivotable about the pivot axis 60a. When frictional resistance from the friction member 76 is not transmitted to the first gear 61, the pivotable member 60 moves to the first position by its own weight.

In this case, as frictional resistance from the friction member 76 is not transmitted to the pivotable member 60 located at the first position, there is no resulting reaction force acting toward the second position. Thus, the pivotable member 60 stays at the first position.

In the hinge device 6, the toothless portion 61b of the first gear 61 functions as a disengage mechanism configured to, when the pivotable member 60 is at the first position, disengage the first gear 61 and the second gear 71 of the second gear assembly 70 from each other. Thus, when the pivotable member 60 pivots from the second position to the first position, there is no reaction force resulting from the frictional resistance applied to the second gear 71, and thus the pivotable member 60 stays at the first position without moving back from the first position toward the second position.

This embodiment shows, but is not limited to that the toothless portion 61b as the disengage mechanism is provided at the first gear 61. The disengage mechanism may be a toothless portion provided at the second gear 71 of the second gear assembly 70.

However, the toothless portion 61b formed at the first gear 61 facilitates designing of a phase at which the first gear 61 and the second gear 71 are disengaged from each other, compared with a case where a toothless portion is formed at the second gear 71 of the second gear assembly 70 that rotates in response to pivotal movement of the pivotable member 60.

The pivotable member 60 is at a horizontal position when at the first position. When the first gear 61 is disengaged from the second gear 71 of the second gear assembly 70, the pivotable member 60 moves to the first position by its own weight and stays there reliably, compared with a case where the pivotable member 60 is configured to be vertical when at the first position.

The second gear 71 is urged by the pressing spring 73 in a direction where a pressing force against the friction member 76 increases, and receives rotational frictional resistance from the friction member 76 effectively. This allows the friction member 76 to apply great frictional resistance to the second gear 71. Thus, while the first gear 61 is engaged with the second gear 71 of the second gear assembly 70, the pivotable member 60 can be held at any angle reliably.

In a case where the first gear 61 is a helical gear, when the pivotable member 60 pivots and the first gear 61 causes the second gear 71 of the second gear assembly 70 to rotate, the second gear 71 may be subject to a force in the direction of the rotation axis 70a. As the force applied to the second gear 71 varies in the direction of the rotation axis 70a, pivotal movement of the pivotable member 60 may be unstable.

The first gear 61 is a spur gear in this embodiment. When the first gear 61 causes the second gear 71 to rotate, a force having the direction of the rotation axis 70a is not applied to the second gear 71, which stabilizes pivotal movement of the pivotable member 60.

This embodiment shows, but is not limited to that, the first gear 61 is directly engaged with the second gear 71 of the second gear assembly 70. The first gear 61 and the second gear 71 of the second gear assembly 70 may be engaged with each other indirectly via an intermediate gear. In this case, the intermediate gear may have a toothless portion corresponding to the toothless portion 61b of the first gear 61, and the toothless portion of the intermediate gear may face the second gear 71 when the pivotable member 60 is at the first position.

Second Embodiment

The hinge device 6 of the first embodiment may be structured as follows.

Figure 8A:
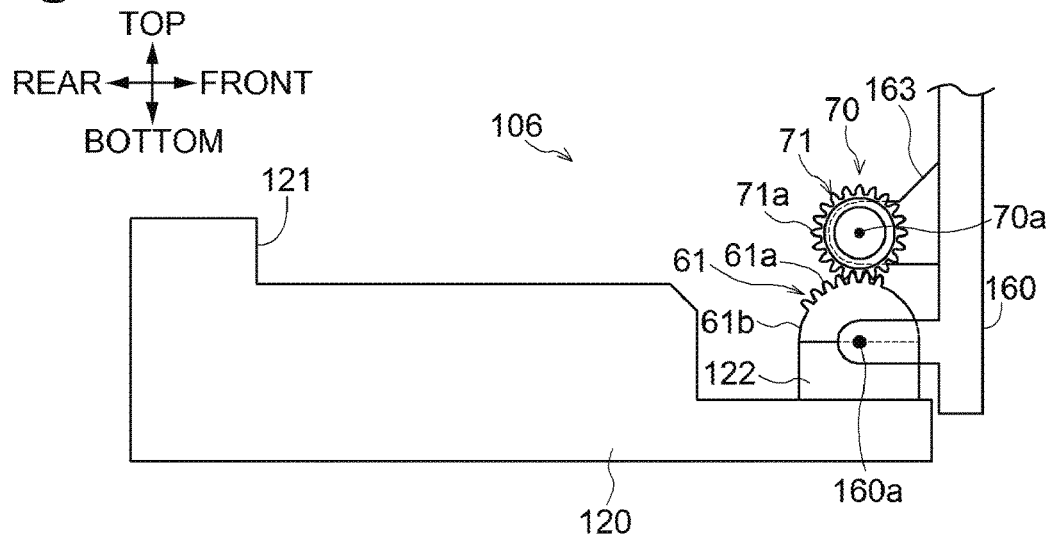
FIG. 8A is a sectional view of a hinge device according to a second embodiment, in which a pivotable member is located at a second position.
Figure 8B:
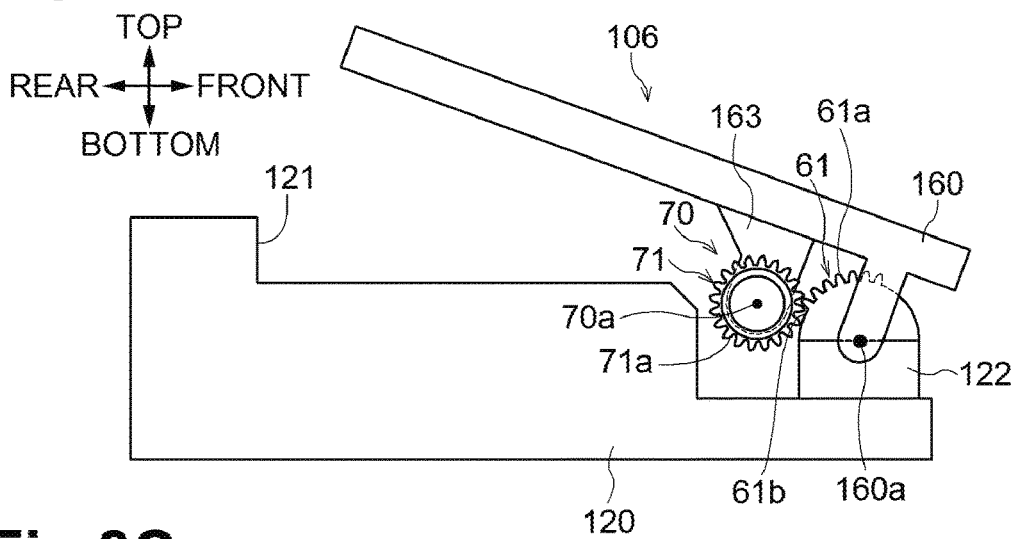
FIG. 8B is a sectional view of the hinge device according to the second embodiment, in which the pivotable member is located at a position slightly apart from a first position toward the second position and the first gear is disengaged from a second gear of the second gear assembly.
Figure 8C:
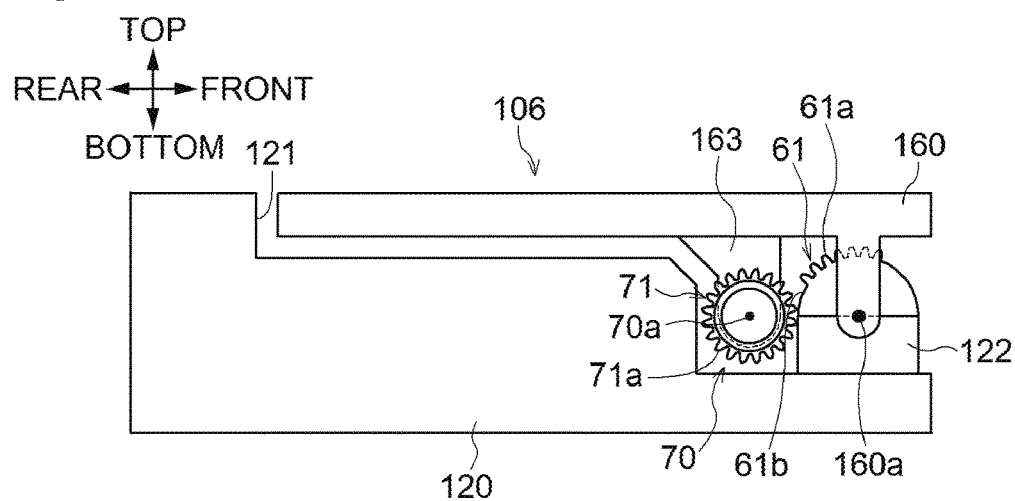
FIG. 8C is a sectional view of the hinge device according to the second embodiment, in which the pivotable member is located at the first position.

As illustrated in FIGS. 8A-8C, a hinge device 106 of the second embodiment is different from the hinge device 6 of the first embodiment in that the first gear 61 is located at a support member 120 and the second gear assembly 70 is located at a pivotable member 160.

The support member 120 is mounted in the upper surface of the housing 2. The support member 120 includes an accommodating portion 121 and a support portion 122. The accommodating portion 121 is open-topped and configured to accommodate the pivotable member 160. The support portion 122 supports the first gear 61.

The pivotable member 160 is supported by the support member 120 such that the pivotable member 160 is pivotable about a pivot axis 160a. The pivotable member 160 is configured to pivot about the pivot axis 160a between a first position (FIG. 8C) where the pivotable member 160 is proximate to the support member 120 and accommodated in the accommodating portion 121 and a second position (FIG. 8A) where the pivotable member 160 is further away from the support member 120 than at the first position.

The first gear 61 is fixed to the support member 120. That is, the first gear 61 is located so as not to rotate relative to the support member 120.

The pivotable member 160 includes a support portion 163. The support portion 163 supports the second gear assembly 70 such that the second gear 71 of the second gear assembly 70 rotates about the rotation axis 70a.

When the pivotable member 160 is at the second position, the second gear 71 of the second gear assembly 70 is engaged with the first gear 61.

When the pivotable member 160 pivots from the second position toward the first position, the second gear 71 engaged with the first gear 61 rotates around the pivot axis 160a and rotates about the rotation axis 70a. That is, while engaged with the first gear 61, the second gear 71 of the second gear assembly 70 rotates in response to pivotal movement of the pivotable member 160.

Even in the second embodiment where the first gear 61 is located at the support member 120 and the second gear assembly 70 is located at the pivotable member 160, the second gear 71 receives rotational frictional resistance from the friction member 76, allowing the pivotable member 160 to stop at an angle of when pivotal movement of the pivotable member 160 is stopped.

In the hinge device 106, as illustrated in FIG. 8B, when the pivotable member 160 pivots from the second position toward the first position, the teeth portion 61a of the first gear 61 and the teeth portion 71a of the second gear 71 are disengaged from each other just before the pivotable member 160 arrives at the first position. As illustrated in FIG. 8C, when the pivotable member 160 is at the first position, the second gear 71 faces the toothless portion 61b of the first gear 61, and is disengaged from the first gear 61. In this case, after the second gear 71 is disengaged from the first gear 61 as illustrated in FIG. 8B, the pivotable member 160 moves to the first position by its own weight as illustrated in FIG. 8C.

The second embodiment shows, but is not limited to that, the first gear 61 is directly engaged with the second gear 71 of the second gear assembly 70. The first gear 61 and the second gear 71 of the second gear assembly 70 may be engaged with each other indirectly via an intermediate gear. In this case, the intermediate gear may have a toothless portion corresponding to the toothless portion 61b of the first gear 61, and the toothless portion of the intermediate gear may face the second gear 71 when the pivotable member 160 is at the first position.

Third Embodiment

The hinge device 6 of the first embodiment may be structured as follows.

A hinge device 206 of the third embodiment is different from the hinge device 6 of the first embodiment in that a second gear assembly 270 is movable in directions to increase and decrease a distance between a pivot axis 260a and a rotation axis 270a, and the disengage mechanism includes springs 224 and a cam member 262.

Figure 9:
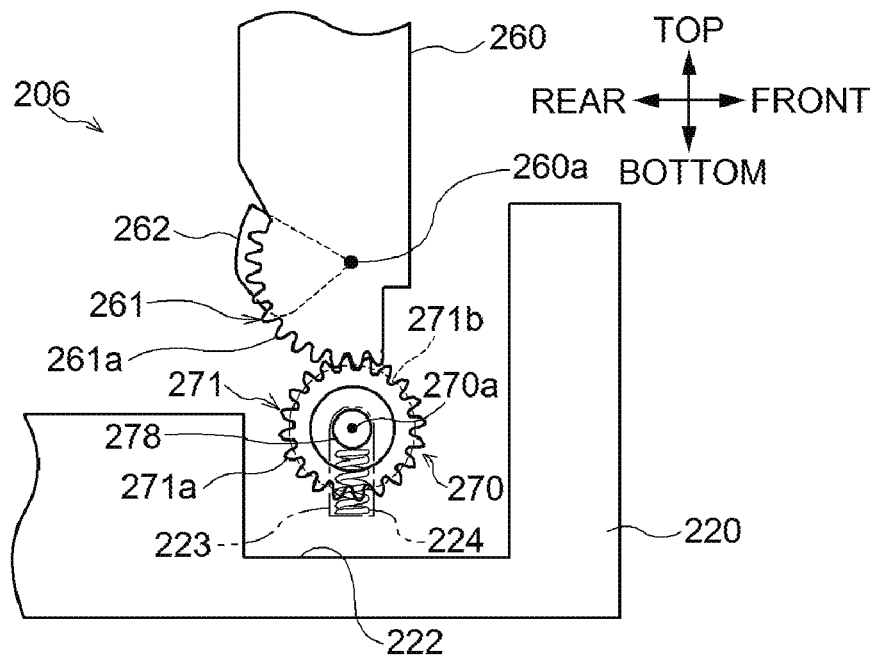
FIG. 9 is a sectional view of a hinge device according to a third embodiment, in which a pivotable member is located at a second position.
Figure 10:
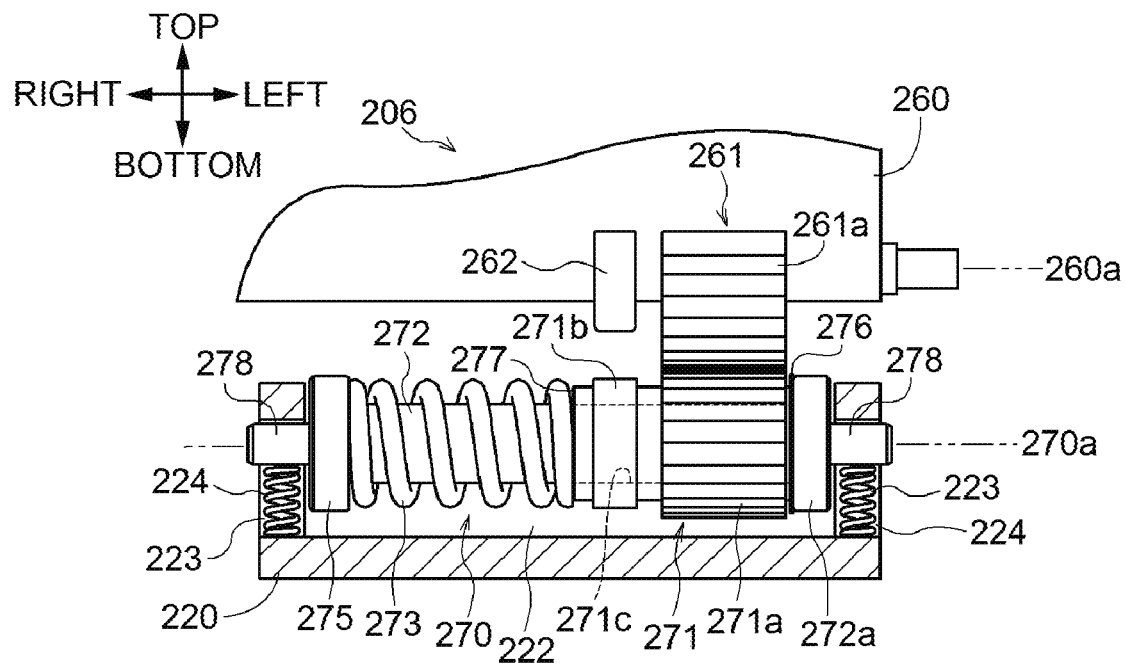
FIG. 10 is a rear sectional view of the hinge device according to the third embodiment, in which the pivotable member is located at the second position.

As illustrated in FIGS. 9 and 10, in the hinge device 206 of the third embodiment, a first gear 261 is located at a pivotable member 260, and a second gear assembly 270 is located at a support member 220.

The support member 220 is mounted in the upper surface of the housing 2, and the pivotable member 260 is supported by the support member 220 such that the pivotable member 260 is pivotable about the pivot axis 260a.

The pivotable member 260 is configured to pivot about the pivot axis 260a between a first position (FIG. 11C) where the pivotable member 260 is proximate to the support member 220 and a second position (FIG. 9) where the pivotable member 26 is further away from the support member 220 than at the first position. The first gear 261 is configured to rotate about the pivot axis 260a integrally with the pivotable member 260. The pivot axis 260a is an example of an axis of the first gear 261. The second gear assembly 270 is supported at the support groove portion 222 of the support member 220.

The second gear assembly 270 includes a second gear 271, a gear shaft 272, and a pressing spring 273. The second gear 271 includes a teeth portion 271a engageable with the first gear 261, and a contact portion 271b. The gear shaft 272 is supported at the support groove portion 222 of the support member 220, and supports the second gear 271 such that the second gear 271 rotates about the rotation axis 270a. The pressing spring 273 urges the second gear 271 to the left in the direction of the rotation axis 270a. The rotation axis 270a is an example of an axis of the second gear assembly 270. The pressing spring 273 is a compression spring.

The second gear assembly 270 is supported by the support member 220 in an orientation where the rotation axis 270a of the second gear 271 is parallel to the pivot axis 260a.

In the second gear 271, the contact portion 271b is at a different position from the teeth portion 271a in a direction of the rotation axis 270a, that is, to the right of the teeth portion 271a.

The second gear 271 has a support hole 271c formed therethrough in the direction of the rotation axis 270a, and the support hole 271c receives the gear shaft 272 therein rotatably.

The gear shaft 272 extends through the second gear 271 in the direction of the rotation axis 270a. A left portion of the gear shaft 272 extending from the second gear 271 to the left in the direction of the rotation axis 270a includes a large-diameter portion 272a. In the second gear 271, the large-diameter portion 272a has a diameter larger than a diameter of a portion where the second gear 271 is fitted.

The pressing spring 273 is fitted around a portion of the gear shaft 272 extending from the second gear 271 toward the right in the direction of the rotation axis 270a. The gear shaft 272 has its right end portion in the direction of the rotation axis 270a where a bearing 275 is fitted.

The pressing spring 273 is disposed between the bearing 275 and the second gear 271 in a compressed state, and urges the second gear 271 to the left in the direction of the rotation axis 270a.

The gear shaft 272 includes a support shaft 278 extending from the large-diameter portion 272a to the left in the direction of the rotation axis 270a and a support shaft 278 extending from the bearing 275 to the right in the direction of the rotation axis 270a.

The support member 220 has guide holes 223 at positions corresponding to both end portions of the gear shaft 272 in the direction of the rotation axis 270a. The support shafts 278 are slidably received in the respective guide holes 223. Thus, the second gear assembly 270 is movably supported by the support member 220 in directions to increase and decrease the distance between the rotation axis 270a and the pivot axis 260a.

The springs 224 are received in the guide holes 223, respectively, to urge the respective support shafts 278 in a direction to decrease the distance between the rotation axis 270a and the pivot axis 260a. The support shafts 278 are urged by the respective springs 224, and the second gear assembly 270 is urged in the direction to decrease the distance between the rotation axis 270a and the pivot axis 260a.

The second gear assembly 270 includes a friction member 276, which is located between the second gear 271 and the large-diameter portion 272a of the gear shaft 272. The friction member 276 is in contact with a left end surface of the second gear 271 in the direction of the rotation axis 270a.

A resin member 277 is located between the pressing spring 273 and the second gear 271. The resin member 277 is made from a material having a lower friction coefficient than a material of the friction member 276. This reduces the spring 273 from rotating together with the second gear 271 when the second gear 271 rotates, thus reducing the occurrence of unusual noise and deteriorated pivotal movement of the pivotable member 260.

The first gear 261 located at the pivotable member 260 includes a teeth portion 261a engageable with a teeth portion 271a of the second gear 271.

The pivotable member 260 includes the cam member 262. The cam member 262 is configured to, when the pivotable member 260 pivots from the second position toward the first position, contact the contact portion 271c of the second gear assembly 270 located at the support member 220 to press the second gear assembly 270 in a direction to increase the distance between the rotation axis 270a and the pivot axis 260a.

The first gear 261 and the second gear 271 of the second gear assembly 270 are spur gears.

In the hinge device 206 structured above, as illustrated in FIG. 9, when the pivotable member 260 is at the second position, the second gear assembly 270 is urged by the springs 224 in the direction to decrease the distance between the rotation axis 270a and the pivot axis 260a, and thus the first gear 261 and the second gear 271 of the second gear assembly 270 are engaged with each other. When the pivotable member 260 is at the second position, the cam member 262 of the pivotable member 260 is apart from the contact portion 271b of the second gear assembly 270.

Figure 11A:
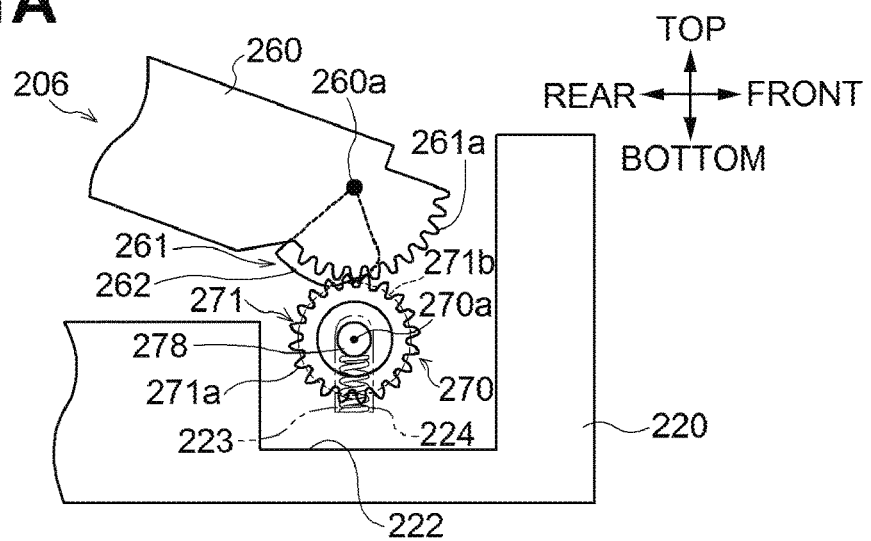
FIG. 11A is a sectional view of the hinge device according to the third embodiment, in which the pivotable member is located at a position slightly apart from the first position toward the second position, and a cam member is in contact with the second gear.

As illustrated in FIG. 11A, when the pivotable member 260 pivots from the second position toward the first position, the cam member 262 rotates about the pivot axis 260a integrally with the pivotable member 260, and contacts the contact portion 271b of the second gear assembly 270.

When the pivotable member 260 further pivots from a state illustrated in FIG. 11A toward the first position, the cam member 262 presses the contact portion 271b against urging forces of the springs 224 in the direction to increase the distance between the rotation axis 270a and the pivot axis 260a.

Figure 11B:
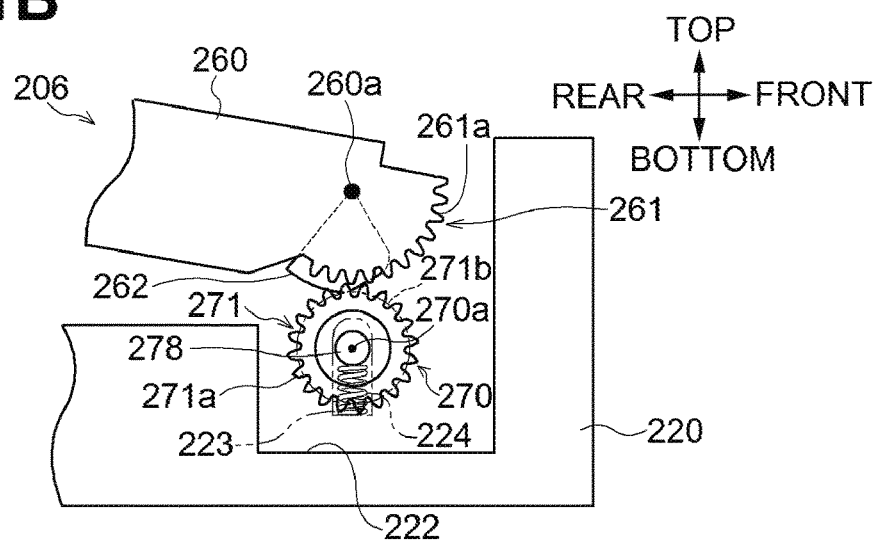
FIG. 11B is a sectional view of the hinge device according to the third embodiment, in which the pivotable member is located at a position slightly apart from the first position toward the second position, and the second gear is pressed by the cam member and disengaged from the first gear.

As illustrated in FIG. 11B, when the cam member 262 presses the contact portion 271b and the distance between the rotation axis 270a and the pivot axis 260a is increased, the first gear 261 and the second gear 271 are disengaged from each other.

Figure 11C:
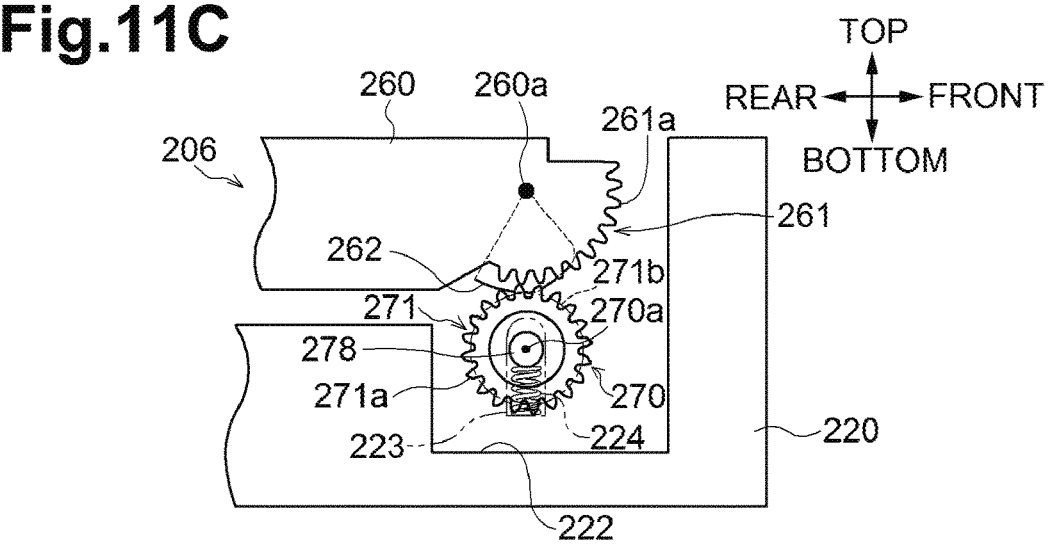
FIG. 11C is a sectional view of the hinge device according to the third embodiment, in which the pivotable member is located at the first position.

When the first gear 261 and the second gear 271 are disengaged from each other, frictional resistance from the friction member 276 is not transferred to the first gear 261, and as illustrated in FIG. 11C, the pivotable member 260 moves to the first position by its own weight.

In this case, as frictional resistance from the friction member 276 is not transmitted to the pivotable member 260 at the first position, there is no resulting reaction force acting toward the second position. Thus, the pivotable member 260 stays at the first position.

In the hinge device 206, a disengage mechanism that disengages the first gear 261 and the second gear 271 of the second gear assembly 270 from each other or disengages rotation of the first gear 261 includes the springs 224 each urging the movable second gear assembly 270 in the direction to decrease the distance between the rotation axis 270a and the pivot axis 260a, and the cam member 262 configured to, when the pivotable member 260 pivots from the second position toward the first position, contact the contact portion 271b of the second gear assembly 270 to press the second gear assembly 270 in the direction to increase the distance between the rotation axis 270a and the pivot axis 260a.

When the pivotable member 260 is at the first position, the disengage mechanism disengages the first gear 261 and the second gear 271 of the second gear assembly 270 from each other or disengages rotation of the first gear 261. Thus, when the pivotable member 260 pivots from the second position to the first position, there is no reaction force resulting from the frictional resistance applied to the second gear 271, and thus the pivotable member 260 stays at the first position without moving back from the first position toward the second position.

When the pivotable member 260 pivots to the first position, the first gear 261 and the second gear 271 of the second gear assembly 270 are disengaged from each other accurately.

The third embodiment shows, but is not limited to that, the first gear 261 is located at the pivotable member 260 and the second gear assembly 270 is located at the support member 220. The disengage mechanism of the third embodiment is applicable to a hinge device where the first gear 261 is located at the support member 220 and the second gear assembly 270 is located at the pivotable member 260.

The third embodiment shows, but is not limited to that, the first gear 261 is directly engaged with the second gear 271 of the second gear assembly 270. The first gear 261 and the second gear 271 of the second gear assembly 270 may be engaged with each other indirectly via an intermediate gear.

Fourth Embodiment

The hinge device 6 of the first embodiment may be structured as follows.

A hinge device 306 of the fourth embodiment is different from the hinge device 6 of the first embodiment in that a second gear assembly 370 is movable in a direction of a rotation axis 370a, and a disengage mechanism includes a spring 373 and a first pressing member 362.

As illustrated in FIGS. 12 and 13, in the hinge device 306 of the fourth embodiment, a first gear 361 is located at a pivotable member 360, and a second gear assembly 370 is located at a support member 320. The support member 320 is mounted in the upper surface of the housing 2, and the pivotable member 360 is supported by the support member 320 such that the pivotable member 360 is pivotable about a pivot axis 360a.

The pivotable member 360 is configured to pivot about the pivot axis 360a between a first position (FIGS. 12B and 13B) where the pivotable member 360 is located proximate to the support member 320 and a second position (FIGS. 12A and 13A) where the pivotable member 360 is further away from the support member 320 than at the first position. The first gear 361 is rotatable about the pivot axis 360a integrally with the pivotable member 360. The second gear assembly 370 is supported by a support groove portion 322 of the support member 320.

The second gear assembly 370 includes a second gear 371, a gear shaft 372, and the spring 373. The spring 373 is a compression spring. The second gear 371 includes a teeth portion 371a engageable with the first gear 361, and a tubular portion 371b without the teeth portion 371a formed. The tubular portion 371b is not engaged with the first gear 361.

The gear shaft 372 is supported at the support groove portion 322 of the support member 320, and supports the second gear 371 such that the second gear 371 rotates about the rotation axis 370a. The spring 373 urges the second gear 371 to the left in the direction of the rotation axis 370a. The rotation axis 370a is an example of an axis of the second gear assembly 370.

The spring 373 is disposed to the right of the second gear 371 in the direction of the rotation axis 370a, and functions as a pressing spring which urges the second gear 371 to the left in the direction of the rotation axis 370a.

The second gear assembly 370 is supported by the support member 320 in an orientation where the rotation axis 370a of the second gear 371 is parallel to the pivot axis 360a.

In the second gear 371, the tubular portion 371b is at a different position from the teeth portion 371a in the direction of the rotation axis 370a, that is, to the right of the teeth portion 371a.

The second gear 371 has a support hole 371c formed therethrough in the direction of the rotation axis 370a, and the support hole 371c receives the gear shaft 372 therein rotatably and slidably in the direction of the rotation axis 370a. In other words, the gear shaft 372 supports the second gear 371 movably in the direction of the rotation axis 370a.

The gear shaft 372 extends through the second gear 371 in the direction of the rotation axis 370a. A left end portion of the gear shaft 372 extending from the second gear 71 to the left in the direction of the rotation axis 370a includes a large-diameter portion 372a. In the second gear 371, the large-diameter portion 372a has a diameter larger than a diameter of a portion where the second gear 371 is fitted.

The spring 373 is fitted around a right portion of the gear shaft 372 extending from the second gear 371 toward the right in the direction of the rotation axis 370a. The gear shaft 372 has its right end in the direction of the rotation axis 370a into which a screw 374 is inserted.

The spring 373 is disposed between a bearing 375 and the second gear 371 in a compressed state, and urges the second gear 371 to the left in the direction of the rotation axis 370a.

Slide members 379a, 379b are fitted around a left portion of the gear shaft 372 from the second gear 371 slidably in the direction of the rotation axis 370a. The slide members 379a, 379b are disposed between the second gear 371 and the large-diameter portion 372a. The slide member 379a is disposed to the right of the slide member 379b in the direction of the rotation axis 370a.

The support groove portion 322 of the support member 320 includes support protrusions 322b, 322c protruding inwardly from an inner peripheral surface of the support groove portion 322 in a radial direction of the second gear assembly 370.

The support protrusion 322b supports the large-diameter portion 372a of the gear shaft 372, and the support protrusion 322c supports the bearing 375. Thus, the second gear assembly 370 is supported at the support groove portion 322 of the support member 320 such that the second gear 371 is rotatable relative to the support member 320.

The second gear assembly 370 includes a friction member 376, which is located between the second gear 371 and the slide member 379a. The friction member 376 is in contact with a left end surface of the second gear 371 in the direction of the rotation axis 370a. The friction member 376 applies rotational frictional resistance to the second gear 371.

A resin member 377 is located between the spring 373 and the second gear 371. The resin member 377 is made from a material having a lower friction coefficient than a material of the friction member 376. This reduces the spring 373 from rotating together with the second gear 371 when the second gear 371 rotates, thus reducing the occurrence of unusual noise and deteriorated pivotal movement of the pivotable member 360.

The first gear 361 located at the pivotable member 360 includes a tooth portion 361a engageable with a teeth portion 371a of the second gear 371.

The pivotable member 360 includes the first pressing member 362. The first pressing member 362 is configured to urge the second gear 371 of the second gear assembly 370 against the urging force of the spring 373 to the right in the direction of the rotation axis 370a. The first pressing member 362 is disposed to the left of the first gear 361 in the direction of the rotation axis 370a.

The first pressing member 362 moves integrally with the pivotable member 360. As illustrated in FIGS. 12B and 13B, when the pivotable member 360 is at the first position, the first pressing member 362 is not between the slide members 379a, 379b and does not press the second gear 371.

When the pivotable member 360 is at the first position and the first pressing member 362 does not press the second gear 371, the second gear 371 is urged by the spring 373 to the left in the direction of the rotation axis 370a, and located at a disengaged position where it is disengaged from the first gear 361.

In this state, the slide members 379a, 379b are pressed in contact with each other in the direction of the rotation axis 370a by the urging force of the spring 373, and the tubular portion 371b of the second gear 371 faces the first gear 361.

Figure 12A:
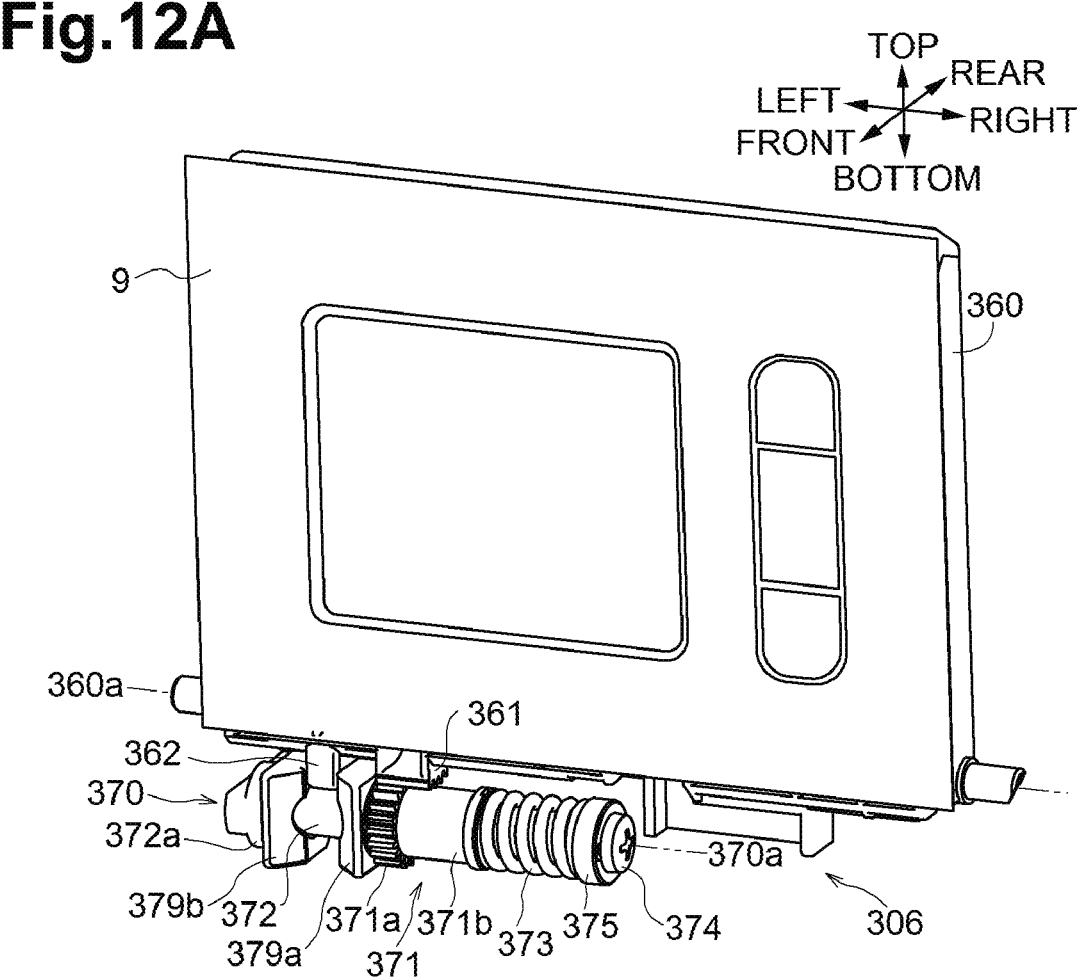
FIG. 12A is a front perspective view of a hinge device according to a fourth embodiment, in which a pivotable member is located at a second position.
Figure 12B:
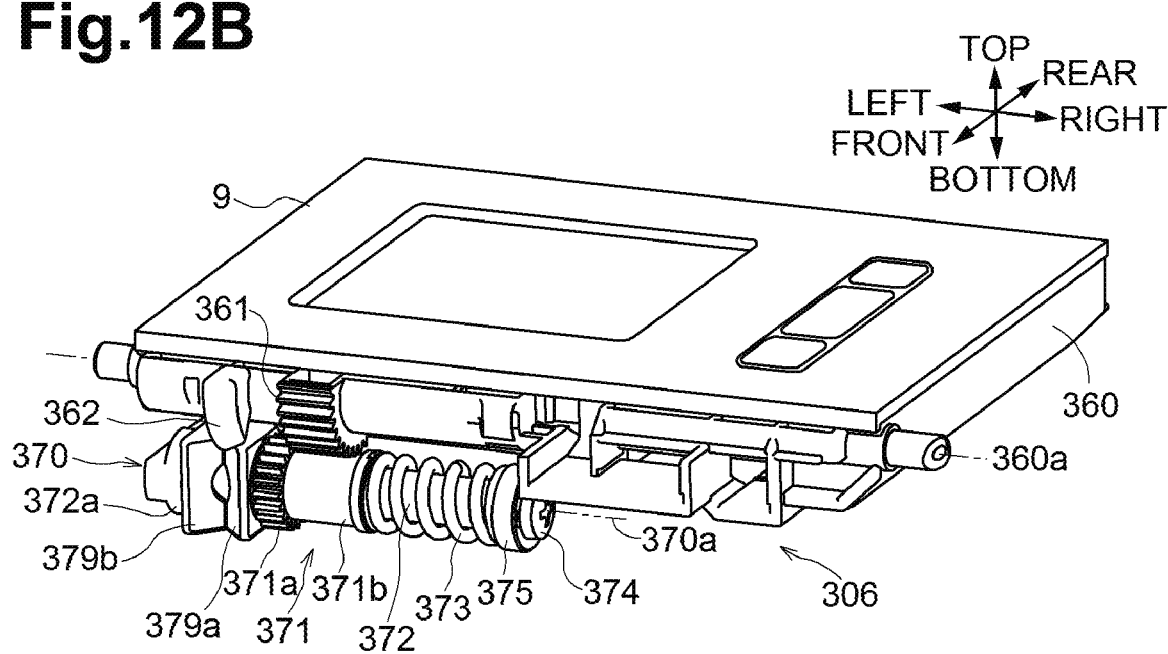
FIG. 12B is a front perspective view of the hinge device according to the fourth embodiment, in which the pivotable member is located at a first position.
Figure 13A:
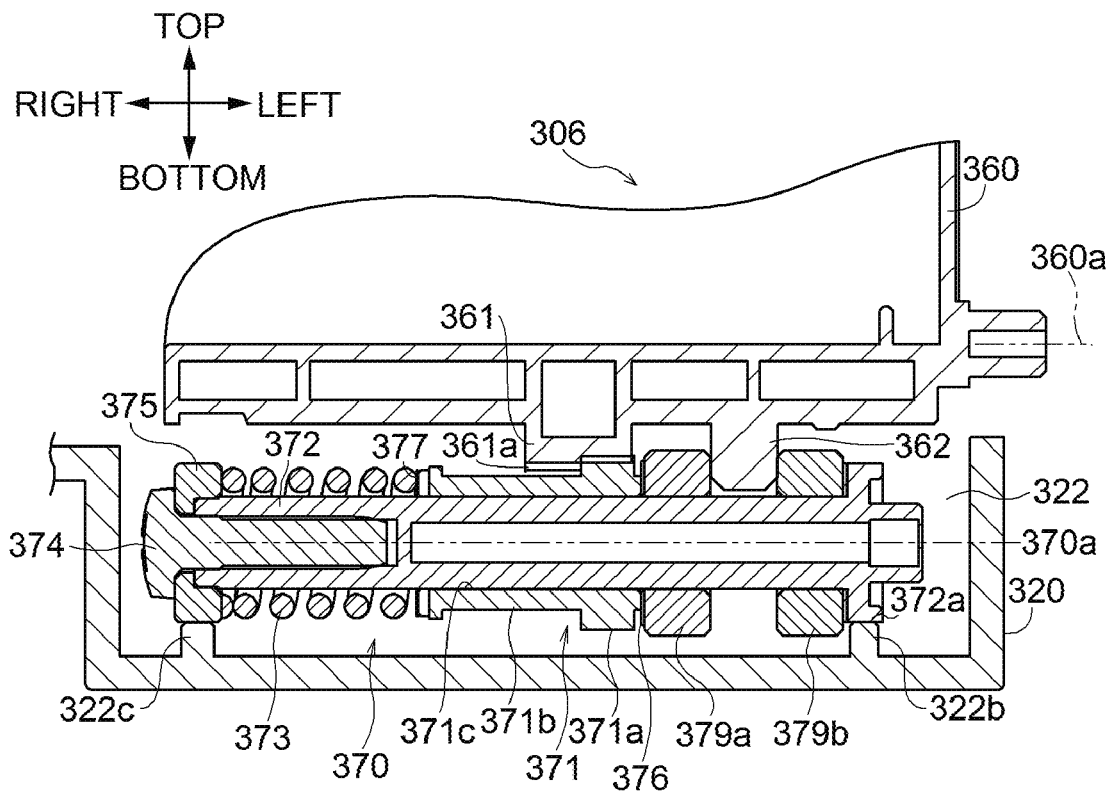
FIG. 13A is a sectional view of the hinge device according to the fourth embodiment, in which the pivotable member is located at the second position.
Figure 13B:
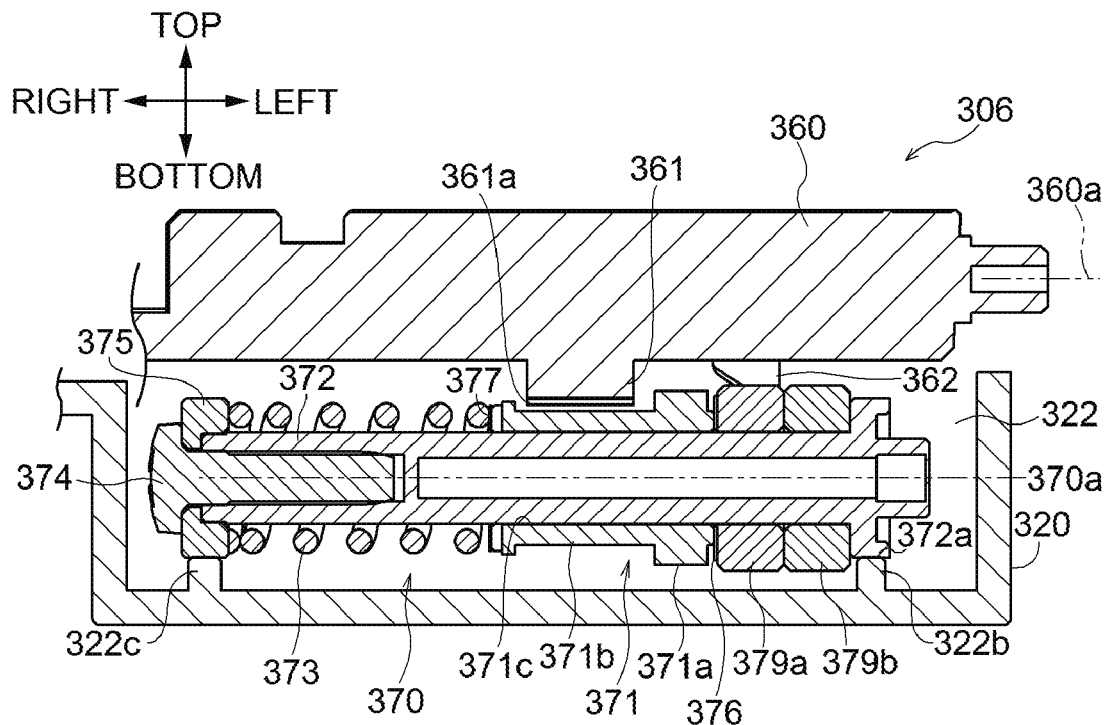
FIG. 13B is a sectional view of the hinge device according to the fourth embodiment, in which the pivotable member is located at the first position.

As illustrated in FIGS. 12A and 13A, when the pivotable member 360 is at the second position, the first pressing member 362 presses the second gear 371 against the urging force of the spring 373 to the right in the direction of the rotation axis 370a. The first pressing member 362 presses the second gear 371 by pressing the slide member 379a to the right in the direction of the rotation axis 370a while entering between the slide members 379a, 379b in response to pivotal movement of the pivotable member 360 from the first position toward the second position.

When the pivotable member 360 pivots from the first position toward the second position, and the second gear 371 is pressed to the right in the direction of the rotation axis 370a by the first pressing member 362, the second gear 371 moves to an engaged position where the second gear 371 is engaged with the first gear 361.

At this time, the first pressing member 362 is in between the slide members 379a, 379b and the slide members 379a, 379b are spaced apart from each other in the direction of the rotation axis 370a. In addition, the teeth portion 371a of the second gear 371 faces the first gear 361, and the second gear 371 and the first gear 361 are engaged with each other.

The first gear 361 and the second gear 371 of the second gear assembly 370 are spur gears.

In the hinge device 306 structured above, when the pivotable member 360 is at the second position, the second gear 371 is at the engaged position or engaged with the first gear 361, frictional resistance from the friction member 376 is transmitted to the first gear 361 via the second gear 371.

When the pivotable member 360 pivots from the second position toward the first position, the first pressing member 362 rotates moves integrally with the pivotable member 360 in a direction away from the slide members 379a, 379b. When the pivotable member 360 pivots to a position just short of the first position, the first pressing member 362 moves out from between the slide members 379a, 379.

When the first pressing member 362 moves out from between the slide members 379a, 379b, the second gear 371 is urged into the disengaged position by the spring 373. When the second gear 371 is at the disengaged position, the second gear 371 is disengaged from the first gear 361, frictional resistance from the friction member 376 is not transmitted to the first gear 361, the pivotable member 360 moves to the first position by its own weight.

In this case, as frictional resistance from the friction member 376 is not transmitted to the pivotable member 360 located at the first position, there is no resulting reaction force acting toward the second position. Thus, the pivotable member 360 stays at the first position.

In the hinge device 306, the disengage mechanism that disengages the first gear 361 and the second gear 371 of the second gear assembly 370 from each other or disengages rotation of the first gear 361 includes the spring 373 urging the second gear 371 of the second gear assembly 370 to the left in the direction of the rotation axis 370a, and the first pressing member 362 located at the pivotable member 360 to press the second gear 371 against the urging force of the spring 373 to the right in the direction of the rotation axis 370a.

The second gear 371 of the second gear assembly 370 is configured to move between the engaged position and the disengaged position. When the pivotable member 360 is at the first position, the first pressing member 362 does not press the second gear 371 and the second gear 371 is located at the disengaged position by the urging force of the spring 373. When the pivotable member 360 pivots from the first position toward the second position, the second gear 371 is pressed by the first pressing member 362 and moves to the engaged position against the urging force of the spring 373.

Thus, when the pivotable member 360 is at the first position, the disengage mechanism disengages the first gear 361 and the second gear 371 of the second gear assembly 370 from each other or disengages rotation of the first gear 361. When the pivotable member 360 pivots from the second position to the first position, there is no reaction force resulting from the frictional resistance applied to the second gear 371, and thus the pivotable member 360 stays at the first position without moving back from the first position toward the second position.

When the pivotable member 360 pivots to the first position, the first gear 361 and the second gear 371 of the second gear assembly 370 are disengaged from each other accurately.

The fourth embodiment shows, but is not limited to that, the second gear 371 is at the disengaged position when it is not pressed by the first pressing member 362 and is urged to the left in the direction of the rotation axis 370a by the urging force of the spring 373, and the second gear 371 is at the engaged position when it is pressed to the left in the direction of the rotation axis 370a by the first pressing member 362.

The second gear 371 may be located at the engaged position when it is not pressed by the first pressing member 362 and is urged to the left in the direction of the rotation axis 370a by the urging force of the spring 373. The second gear 371 may be located at the engaged position when it is pressed to the right in the direction of the rotation axis 370a by the first pressing member 362.

In this case, when the pivotable member 360 is at the first position, the first pressing member 362 may press the second gear 371 against the urging force of the spring 373 to the disengaged position. When the pivotable member pivots from the first position to the second position, the first pressing member 362 may not press the second gear 371 and the second gear 371 may be urged into the engaged position by the spring 373.

The fourth embodiment shows, but is not limited to that, the first gear 361 is located at the pivotable member 360 and the second gear assembly 370 is located at the support member 320. The disengage mechanism of the fourth embodiment is applicable to a hinge device where the first gear 361 is located at the support member 320 and the second gear assembly 370 is located at the pivotable member 360.

The fourth embodiment shows, but is not limited to that, the first gear 361 is directly engaged with the second gear 371 of the second gear assembly 370. The first gear 361 and the second gear 371 of the second gear assembly 370 may be engaged with each other indirectly via an intermediate gear.

Fifth Embodiment

The hinge device 6 of the first embodiment may be structured as follows.

A hinge device 406 of the fifth embodiment includes a friction release mechanism instead of the disengage mechanism of the hinge device according to the first to fourth embodiments. The friction release mechanism is configured to, when the pivotable member 460 is at the first position, release the second gear 471 of the second gear assembly 470 from receiving frictional resistance from a friction member 476.

As illustrated in FIGS. 14A, 14B, 15A, and 15B, in the hinge device 406 of the fifth embodiment, a first gear 461 is located at a pivotable member 460 and a second gear assembly 470 is located at a support member 42. The support member 420 is mounted in the upper surface of the housing 2, and the pivotable member 460 is supported by the support member 420 such that the pivotable member 460 is pivotable about a pivot axis 460a.

The pivotable member 460 is configured to pivot about the pivot axis 460a between a first position (FIG. 14B) where the pivotable member 460 is located proximate to the support member 420 and a second position (FIG. 14A) where the pivotable member 460 is further away from the support member 420 than at the first position. The first gear 461 is rotatable about the pivot axis 460a integrally with the pivotable member 460. The second gear assembly 470 is supported at a support groove portion 422 of the support member 420.

The second gear assembly 470 includes a second gear 471, a gear shaft 472, and a pressing spring 473. The second gear 471 includes a tooth portion 471a engageable with the first gear 461, and a bearing 471b. The gear shaft 472 is supported at the support groove portion 422 of the support member 420, and supports the second gear 471 such that the second gear 471 rotates about the rotation axis 470a. The pressing spring 473 urges the second gear 471 to the left in a direction of the rotation axis 470a. The rotation axis 470a is an example of an axis of the second gear assembly 470. The pressing spring 473 is a compression spring.

The second gear assembly 470 is supported by the support member 420 in an orientation that the rotation axis 470a of the second gear 471 is parallel to the pivot axis 460a.

In the second gear 471, the bearing 471b is at a different position from the tooth portion 471a in the direction of the rotation axis 470a, that is, to the right of the tooth portion 471a.

The second gear 471 has a support hole 471c formed therethrough in the direction of the rotation axis 470a, and the support hole 471c receives the gear shaft 472 therein rotatably.

The gear shaft 472 extends through the second gear 471 in the direction of the rotation axis 470a. A left portion of the gear shaft 472 extending from the second gear 471 to the left in the direction of the rotation axis 470a includes a large-diameter portion 472a. In the gear shaft 472, the large-diameter portion 472a has a diameter larger than a diameter of a portion where the second gear 471 is fitted.

The pressing spring 473 is fitted around a right portion of the gear shaft 472 extending from the second gear 471 toward the right in the direction of the rotation axis 470a. The gear shaft 472 has its right end in the direction of the rotation axis 470a into which a screw 474 is inserted via a bearing 475.

Slide members 479a, 479b are fitted around a right portion of the gear shaft 472 from the second gear 471 slidably in the direction of the rotation axis 470a. The slide members 479a, 479b are disposed between a spring 473 and the second gear 471. The slide member 479a is disposed to the right of the slide member 479b in the direction of the rotation axis 470a.

The pressing spring 473 is disposed between the bearing 475 and the slide member 479a in a compressed state, and urges the second gear 471 and the slide members 479a, 479b to the left in the direction of the rotation axis 470a.

The support groove portion 442 of the support member 440 includes support protrusions 422a, 422b, 422c protruding inwardly from an inner peripheral surface of the support groove portion 442 in a radial direction of the second gear assembly 470.

The support protrusion 422a supports the bearing 471b of the second gear 471 rotatably, the support protrusion 422b supports the large-diameter portion 472a of the gear shaft 472, and the support protrusion 422c supports a bearing 475.

Thus, the second gear assembly 470 is supported at the support groove portion 422 such that the second gear 471 is rotatable relative to the support member 420.

The friction member 476 is disposed between the second gear 471 and the large-diameter portion 472a. The friction member 476 is in contact with a left end surface of the second gear 471 in the direction of the rotation axis 470a. The friction member 476 applies rotational frictional resistance to the second gear 47.

A resin member 477 is located between the slide member 479b and the second gear 471. The resin member 477 is made from a material having a lower friction coefficient than a material of the friction member 476. This reduces the slide members 479a, 479b and the pressing spring 473 from rotating together with the second gear 471 when the second gear 471 rotates, thus reducing the occurrence of unusual noise and deteriorated pivotal movement of the pivotable member 460.

The first gear 461 located at the pivotable member 460 includes a tooth portion 461a engageable with a tooth portion 471a of the second gear 471. The first gear 461 and the second gear 471 of the second gear assembly 470 are spur gears.

The pivotable member 460 includes a second pressing member 462. The second pressing member 462 is configured to press the pressing spring 473 in a compression direction. In this case, the compression direction where the pressing spring 473 is pressed by the second pressing member 462 is to the right in the direction of the rotation axis 470a. The second pressing member 462 is disposed to the right of the first gear 461 in the direction of the rotation axis 470a.

Figure 14B:
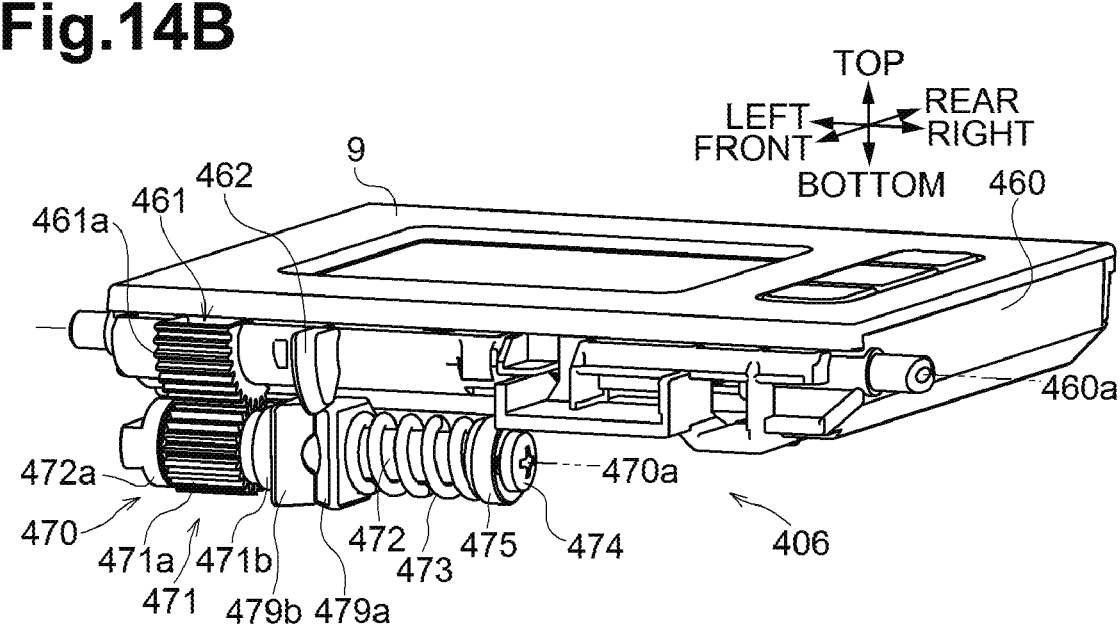
FIG. 14B is a front perspective view of the hinge device according to the fifth embodiment, in which the pivotable member is located at a first position.
Figure 15A:
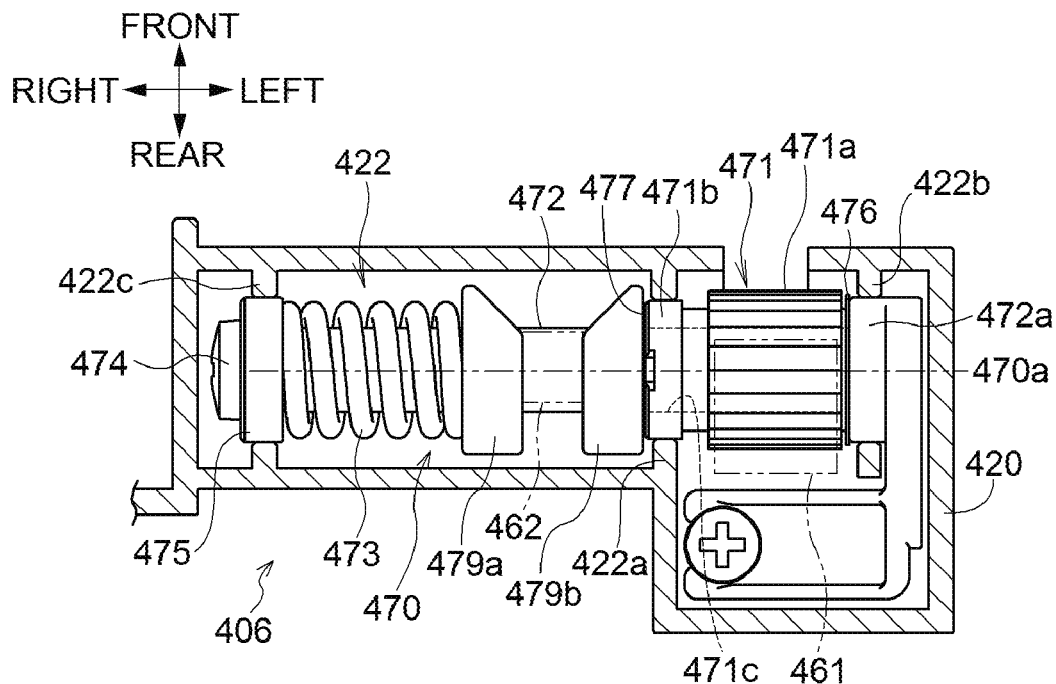
FIG. 15A is a top sectional view of the hinge device according to the fifth embodiment, in which the pivotable member is located at the second position.
Figure 15B:
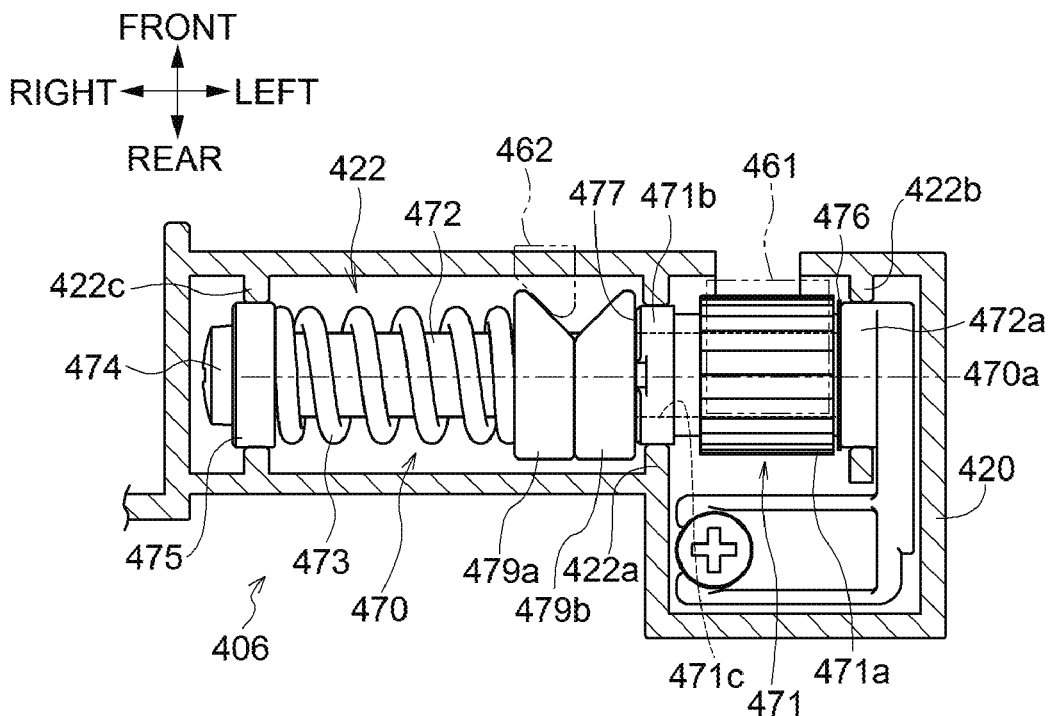
FIG. 15B is a top sectional view of the hinge device according to the fifth embodiment, in which the pivotable member is located at the first position.

The second pressing member 462 moves integrally with the pivotable member 460. As illustrated in FIGS. 14B and 15B, when the pivotable member 460 is at the first position, the second pressing member 462 is not between the slide members 479a, 479b, and does not press the pressing spring 473.

When the pivotable member 460 is at the first position, and the second pressing member 462 does not press the pressing spring 473, the pressing spring 473 is stretched in the direction of the rotation axis 470a and released from the compressed state. When released from the compressed state, the pressing spring 473 has an equilibrium length, and produces no urging force.

When there is no urging force generated in the pressing spring 473, the pressing spring 473 does not press the slide members 479a, 479b and the second gear 471 in the direction of the rotation axis 470a. Thus, when the pivotable member 460 is at the first position, rotational frictional resistance from the friction member 476 is not applied to the second gear 471.

Figure 14A:
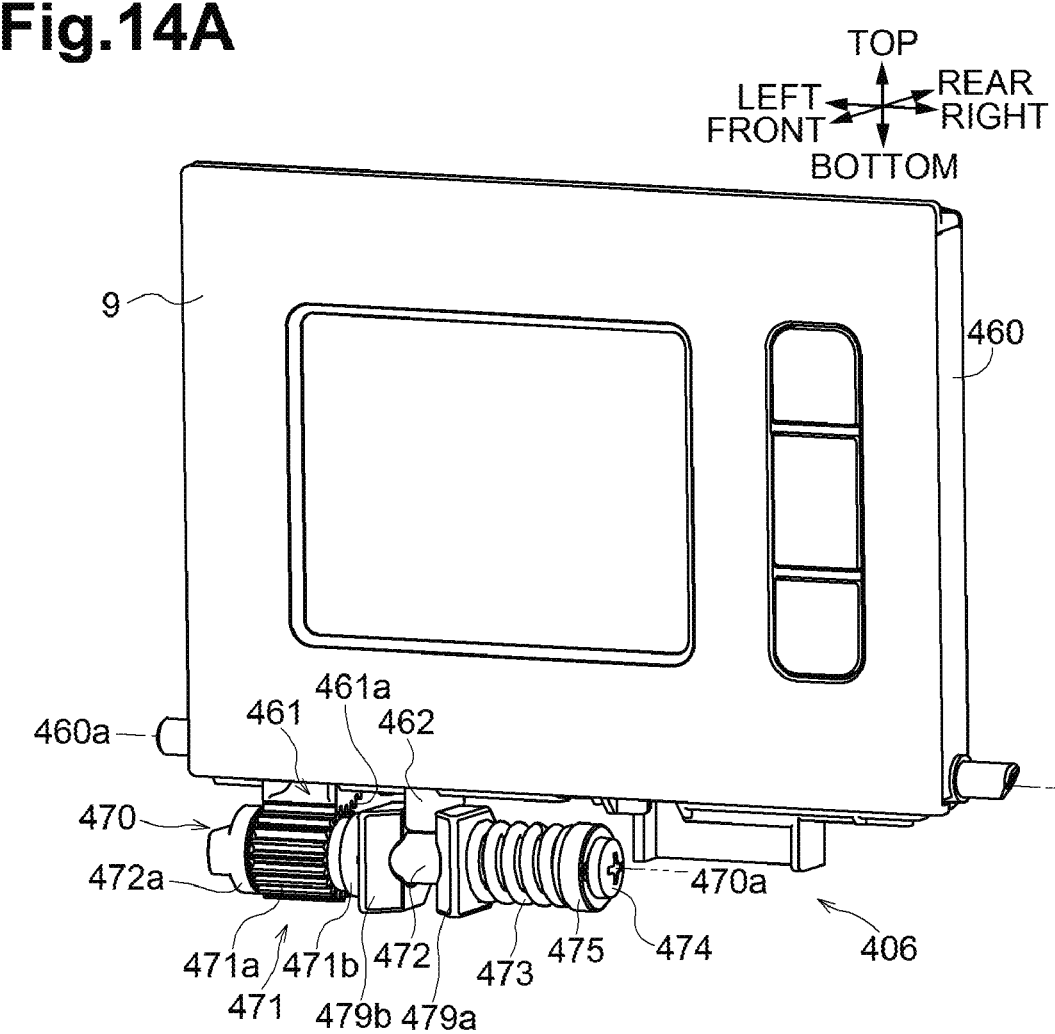
FIG. 14A is a front perspective view of a hinge device according to a fifth embodiment, in which a pivotable member is located at a second position.

As illustrated in FIG. 14A, when the pivotable member 460 is at the second position, the second pressing member 462 presses the slide member 479a to the right in the direction of the rotation axis 470a by entering between the slide members 479a, 479b. When the second pressing member 462 presses the slide member 479a, the second pressing member 462 presses the pressing spring 473 in the compression direction, and the pressing spring 473 is in its compressed state. The compressed pressing spring 473 produces the urging force in the direction of the rotation axis 470a.

Due to the urging force produced in the pressing spring 473, the slide members 479a, 479b, and the second pressing member 462 located therebetween press the second gear 471 to the left in the direction of the rotation axis 470a. Rotational frictional resistance from friction member 476 is applied to the he second gear 471, which is pressed to the left in the direction of the rotation axis 470a due to the urging force of the pressing spring 473.

The second pressing member 462 presses the pressing spring 473 in the compression direction by entering between the slide members 479a, 479b in response to pivotal movement of the pivotable member 460 from the first position toward the second position, and pressing the slide member 479a to the right in the direction of the rotation axis 470a.

In the hinge device 406 structured above, when the pivotable member 460 is at the second position, the pressing spring 473 is pressed in the compression direction, and the urging force of the compressed pressing spring 473 causes the second gear 471 to be pressed to the left in the direction of the rotation axis 470a. While the second gear 471 is pressed to the left in the direction of the rotation axis 470a, the second gear 471 receives rotational frictional resistance from friction member 476, and the rotational frictional resistance applied to the second gear 471 is transmitted to the first gear 461.

When the pivotable member 460 pivots from the second position toward the first position, the second pressing member 462 moves integrally with the pivotable member 460 in a direction away from the slide members 479a, 479b. When the pivotable member 460 pivots to a position just short of the first position, the second pressing member 462 moves out from the slide members 479a, 479b.

When the second pressing member 462 moves out from the slide members 479a, 479b, the pressing spring 473 is stretched and released from the compressed state, and produces no urging force.

In this state, the second gear 471 is not pressed in the direction of the rotation axis 470a by the pressing spring 473, and does not receive rotational frictional resistance from the friction member 476. Thus, rotational frictional resistance from the friction member 476 is not transmitted to the first gear 461, and the pivotable member 460 moves to the first position by its own weight.

In this case, as frictional resistance from the friction member 476 is not transmitted to the pivotable member 460 located at the first position, there is no resulting reaction force acting toward the second position. Thus, the pivotable member 460 stays at the first position.

In the hinge device 406, the fiction release mechanism is configured to, when the pivotable member 460 is at the first position, release the second gear 471 of the second gear assembly 470 from receiving frictional resistance from the friction member 476. The friction release mechanism includes the second pressing member 462 located at the pivotable member 460 where the first gear 461 is located, and configured to press the pressing spring 473 in the compression direction.

The second pressing member 462 is configured to, when the pivotable member 460 pivots from the first position to the second position, press the pressing spring 473 in the compression direction such that the pressing spring 473 produces the urging force. The second pressing member 462 is configured to, when the pivotable member 460 is at the first position, separate from the pressing spring 473 such that the pressing spring 473 is released from the compressed state.

Thus, when the pivotable member 460 is at the first position, the friction release mechanism releases the pressing spring 473 from the compressed state. When the pivotable member 460 pivots from the second position to the first position, there is no reaction force resulting from the frictional resistance applied to the second gear 471, and thus the pivotable member 460 stays at the first position without moving back from the first position toward the second position.

When the pivotable member 460 pivots to the first position, the first gear 461 and the second gear 471 of the second gear assembly 470 are disengaged from each other accurately.

The fifth embodiment shows, but is not limited to that, the first gear 461 is located at the pivotable member 460 and the second gear assembly 470 is located at the support member 420. The friction release mechanism of this embodiment is applicable to a hinge device where the first gear 461 is located at the support member 420 and the second gear assembly 470 is located at the pivotable member 460.

The fifth embodiment shows, but is not limited to that, the first gear 461 is directly engaged with the second gear 471 of the second gear assembly 470. The first gear 461 and the second gear 471 of the second gear assembly 470 may be engaged with each other indirectly via an intermediate gear.

The above embodiments show the hinge device used in the image forming apparatus. The hinge device according to the above embodiments may be used in any other apparatus such as an image reading apparatus.

What is claimed is:

1. A hinge device comprising:
   a support member;
   a pivotable member supported by the support member and configured to pivot about a pivot axis between a closed position and a different position where the pivotable member is in a position that is different from the closed position;
   a first gear located at one of the support member and the pivotable member;
   a second gear located at the other of the support member and the pivotable member, the second gear being configured to rotate in engagement with the first gear based on pivoting of the pivotable member;
   a friction member configured to apply rotational frictional resistance to the second gear;
   means for disengaging, when the pivotable member is at the closed position, the first gear and the second gear from each other; and
   a pressing spring,
   wherein the second gear is disposed between the pressing spring and the friction member in a direction of a rotation axis of the second gear, and
   wherein the pressing spring is configured to urge the second gear toward the friction member.

2. The hinge device according to claim 1,
   wherein the means for disengaging includes a toothless portion located at the first gear, the toothless portion being located such that, when the pivotable member is at the closed position, the toothless portion faces the second gear.

3. The hinge device according to claim 1, further comprising a resin member located between the pressing spring and the second gear, the resin member being made from a material having a lower friction coefficient than a material of the friction member.

4. The hinge device according to claim 1, wherein the first gear is a spur gear.

5. The hinge device according to claim 1, wherein the friction member is made of film synthetic paper.

6. The hinge device according to claim 1, wherein the pivotable member is at a horizontal position when at the closed position.

7. An image forming apparatus comprising:
   a housing;
   an image forming device accommodated in the housing and configured to form an image on a sheet;
   a panel; and
   the hinge device according to claim 1,
   wherein the support member of the hinge device is disposed in a specified surface of the housing, and
   wherein the pivotable member of the hinge device holds the panel.

8. The image forming apparatus according to claim 7, further comprising a discharge tray formed at the specified surface of the housing, wherein the sheet having the image is discharged to the discharge tray,
   wherein the specified surface of the housing is an upper surface, and
   wherein the panel is disposed on a side of the discharge tray at the upper surface of the housing.

9. The image forming apparatus according to claim 8, wherein, when the pivotable member of the hinge device is at the closed position, the panel held by the pivotable member is aligned with the upper surface of the housing.

10. A hinge device comprising:

a support member;

a pivotable member supported by the support member and configured to pivot about a pivot axis between a closed position and a different position where the pivotable member is in a position that is different from the closed position;

a first gear located at one of the support member and the pivotable member;

a second gear located at the other of the support member and the pivotable member, the second gear being configured to rotate in engagement with the first gear based on pivoting of the pivotable member;

a friction member configured to apply rotational frictional resistance to the second gear; and means for disengaging, when the pivotable member is at the closed position, the first gear and the second gear from each other, wherein the friction member is made of film synthetic paper.

11. The hinge device according to claim 10, wherein the means for disengaging includes a toothless portion located at the first gear, the toothless portion being located such that, when the pivotable member is at the closed position, the toothless portion faces the second gear.

12. The hinge device according to claim 10, further comprising:

a pressing spring; and a resin member, wherein the second gear is disposed between the pressing spring and the friction member in a direction of a rotation axis of the second gear, wherein the pressing spring is configured to urge the second gear toward the friction member, and wherein the resin member is located between the pressing spring and the second gear, the resin member being made from a material having a lower friction coefficient than a material of the friction member.

13. The hinge device according to claim 10, wherein the first gear is a spur gear.

14. The hinge device according to claim 10, wherein the pivotable member is at a horizontal position when at the closed position.

15. An image forming apparatus comprising:

a housing;

an image forming device accommodated in the housing and configured to form an image on a sheet;

a panel; and the hinge device according to claim 10, wherein the support member of the hinge device is disposed in a specified surface of the housing, and wherein the pivotable member of the hinge device holds the panel.

16. The image forming apparatus according to claim 15, further comprising a discharge tray formed at the specified surface of the housing, wherein the sheet having the image is discharged to the discharge tray, wherein the specified surface of the housing is an upper surface, and wherein the panel is disposed on a side of the discharge tray at the upper surface of the housing.

17. The image forming apparatus according to claim 16, wherein, when the pivotable member of the hinge device is at the closed position, the panel held by the pivotable member is aligned with the upper surface of the housing.

* * * * *